US011809188B2

(12) United States Patent
Takase et al.

(10) Patent No.: US 11,809,188 B2
(45) Date of Patent: Nov. 7, 2023

(54) TRAVELING WORK MACHINE

(71) Applicant: KUBOTA CORPORATION, Osaka (JP)

(72) Inventors: Shunya Takase, Sakai (JP); Hiroki Suga, Sakai (JP); Koji Matsuda, Sakai (JP); Shunsuke Miyashita, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 284 days.

(21) Appl. No.: 17/295,902

(22) PCT Filed: Dec. 6, 2019

(86) PCT No.: PCT/JP2019/047816
§ 371 (c)(1),
(2) Date: May 21, 2021

(87) PCT Pub. No.: WO2020/129704
PCT Pub. Date: Jun. 25, 2020

(65) Prior Publication Data
US 2021/0397190 A1 Dec. 23, 2021

(30) Foreign Application Priority Data

Dec. 20, 2018 (JP) .................................. 2018-238892
Dec. 20, 2018 (JP) .................................. 2018-238896

(51) Int. Cl.
*G05D 1/02* (2020.01)
*A01B 69/00* (2006.01)
(Continued)

(52) U.S. Cl.
CPC ......... *G05D 1/0212* (2013.01); *A01B 69/008* (2013.01); *A01B 79/005* (2013.01);
(Continued)

(58) Field of Classification Search
CPC .. G05D 1/0212; G05D 1/0088; G05D 1/0278; A01B 69/008; A01B 79/005; B60K 35/00; B60K 2370/152
(Continued)

(56) References Cited

U.S. PATENT DOCUMENTS

2016/0224026 A1\* 8/2016 Hamada ................ E02F 9/2004
2018/0168093 A1   6/2018 Matsuzaki
(Continued)

FOREIGN PATENT DOCUMENTS

JP   2012-120481 A   6/2012
JP   2015-112056 A   6/2015
(Continued)

OTHER PUBLICATIONS

Official Communication issued in corresponding Japanese Patent Application No. 2018-238896, dated Feb. 15, 2022.
(Continued)

Primary Examiner — Mahmoud S Ismail
(74) Attorney, Agent, or Firm — KEATING AND BENNETT, LLP

(57) ABSTRACT

A traveling work machine includes a position detector capable of obtaining position information of a machine body based on a positioning signal from a navigation satellite, an end determiner capable of determining the end of each of a plurality of instances of work travel, a start position calculator capable of calculating start positions Ls and Ls2, and a display capable of displaying information pertaining to the turning travel. When the end determiner determines the end of the work travel, the start position calculator calculates, based on the position information, the start position Ls2 on one of the left and right with respect to the travel direction
(Continued)

of the machine body during the work travel, and the display displays guidance information guiding the turning travel to the start position Ls2.

10 Claims, 13 Drawing Sheets

(51) Int. Cl.
- *A01B 69/04* (2006.01)
- *A01B 79/00* (2006.01)
- *B60K 35/00* (2006.01)
- *G05D 1/00* (2006.01)

(52) U.S. Cl.
CPC ........... *B60K 35/00* (2013.01); *G05D 1/0088* (2013.01); *G05D 1/0278* (2013.01); *B60K 2370/152* (2019.05)

(58) Field of Classification Search
USPC .......................................................... 701/23
See application file for complete search history.

(56) References Cited

U.S. PATENT DOCUMENTS

| | | | |
|---|---|---|---|
| 2019/0227561 A1* | 7/2019 | Hiramatsu | G05D 1/0219 |
| 2020/0348690 A1* | 11/2020 | Ogura | G05D 1/0038 |
| 2022/0050458 A1* | 2/2022 | Nishii | A01B 69/008 |

FOREIGN PATENT DOCUMENTS

| | | |
|---|---|---|
| JP | 2016-007196 A | 1/2016 |
| JP | 2018-099071 A | 6/2018 |
| JP | 2018-148858 A | 9/2018 |

OTHER PUBLICATIONS

Official Communication issued in International Patent Application No. PCT/JP2019/047816, fsyrf Feb. 18, 2020.

* cited by examiner

TRAVELING WORK MACHINE

BACKGROUND OF THE INVENTION

1. Field of the Invention

The present invention relates to a traveling work machine that alternately and repeatedly performs a plurality of instances of work travel, in which a working device performs work while the traveling work machine automatically travels in a field along a pre-set target heading, and turning travel, in which the traveling work machine moves from an end position of the work travel to a start position of the next work travel in an unworked portion of the field while reversing in the opposite direction from the travel direction of the work travel.

2. Description of the Related Art

A work vehicle disclosed in JP 2018-148858A, for example, includes a position detection unit ("receiving device" in the document) capable of obtaining position information pertaining to a machine body using a satellite positioning system, and a maneuvering control unit ("automatic maneuvering control unit" in the document) capable of performing maneuvering control such that the machine body ("traveling machine body" in the document) travels along a target line set in a field. With this work vehicle, a plurality of target lines are arranged in the field, and the work vehicle alternately performs automatic maneuvering control, in which maneuvering control is performed such that the machine body travels along a target line, and turning travel, which is a manual operation of turning to an adjacent target line.

SUMMARY OF THE INVENTION

Incidentally, when turning travel is performed through a manual operation as with the work vehicle disclosed in JP 2018-148858A, an occupant requires skill based on their sense of the width of the machine body, the work width, and the like when making a manual operation for turning and reaching a target position. Accordingly, if guidance for the target position can be given to the occupant during turning travel, the turning travel can be performed easily regardless of the occupant's skill, which makes the turning travel more efficient.

Additionally, when turning travel is performed through a manual operation in such a work vehicle, an occupant requires skill based on their sense of the width of the machine body, the work width, and the like when making a manual operation for turning and reaching a start position of the next work travel. Accordingly, if guidance for the start position can be given to the occupant during turning travel, the work vehicle can be aligned with the start position regardless of the occupant's skill, which makes the turning travel more efficient.

Preferred embodiments of the present invention provide traveling work machines each capable of improving the efficiency of turning travel.

A traveling work machine according to a preferred embodiment of the present invention alternately and repeatedly performs a plurality of instances of work travel, in which a working device performs work while the traveling work machine automatically travels in a field along a pre-set target heading, and turning travel, in which the traveling work machine moves from an end position of the work travel to a start position of next work travel in an unworked portion of the field while switching to a direction opposite from the travel direction of the work travel. The traveling work machine includes a position detector to obtain position information of a machine body based on a positioning signal of a navigation satellite; an end determiner capable of determining an end of each of a plurality of instances of the work travel; a start position calculator to calculate the start position; and a display capable of displaying information pertaining to the turning travel. When the end determiner determines the end of the work travel, the start position calculator calculates, based on the position information, the start position to be on one of a left and a right of a travel direction of the machine body in the work travel, and the display displays guidance information guiding the turning travel to the start position.

According to a preferred embodiment of the present invention, after work travel has ended, the start position of the next work travel is calculated, and turning travel is guided to the start position by the display. Accordingly, even if the turning travel is being performed through manual operations, an occupant can understand where to proceed to after the work travel has ended by checking the display. Furthermore, because guidance for the turning travel to the next start position is provided in the display, the occupant can easily perform operations for turning to the next start position while checking the display, even if the occupant has not yet developed a sense of the machine body width, the work width, and so on. In other words, turning travel can be performed easily regardless of the occupant's skills, which makes the turning travel more efficient. A traveling work machine capable of realizing more efficient turning travel is realized as a result.

In a preferred embodiment of the present invention, preferably, the start position calculator calculates the start position based on a separation distance between a position where a previous instance of the turning travel started and a position where the previous instance of the turning travel ended, and the display displays, in the guidance information, the start position calculated based on the separation distance.

When the work travel and the turning travel are performed alternately and repeatedly as described above, it is often the case that turning travel is repeated in the same or substantially the same pattern. According to this configuration, the start position of the next work travel is calculated based on the pattern of the previous turning travel, and the start position is displayed in the guidance information. This increases the likelihood of the guidance for the turning travel, provided by the start position calculator and the display, matching the occupant's desires.

In a preferred embodiment of the present invention, preferably, a map screen displaying the machine body and surroundings of the machine body is included in the guidance information, and when, for a previous instance of the turning travel, the start position has been calculated in a turn direction in one of a left or a right side relative to the travel direction, the start position calculator calculates, for a current instance of the turning travel, the start position in a turn direction in an other of the left or the right side relative to the travel direction, and the display displays the start position farther toward the other of the left and the right sides than the machine body in the map screen.

When the work travel and the turning travel are performed alternately and repeatedly as described above, and the turning travel is repeated in substantially the same pattern, the travel direction of the work travel reverses between before and after the turning travel, and thus the turn direction of the turning travel is the opposite of the previous turn direction. According to this configuration, the start position is calculated in the one of the left and right directions which is appropriate according to the work state of the traveling work machine, and is displayed in the display, which reduces the risk of, for example, the occupant accidentally performing operations for turning in the direction opposite from the planned turn direction. Furthermore, the start position is displayed in the appropriate one of the left and right directions relative to the machine body in a map screen, which is in the guidance information in the display, and the occupant can therefore intuitively understand the start position of the next work travel.

In a preferred embodiment of the present invention, preferably, a traveling work machine includes a maneuvering tool through which a maneuvering operation of the machine body can be performed by a human; a map screen to display the machine body and surroundings of the machine body is included in the guidance information, and when, in the turning travel, the maneuvering tool is operated in a turn direction to a side opposite from the side on which the start position calculator has calculated the start position, the start position calculator re-calculates the start position in a turn direction on the side to which the maneuvering tool has been operated, and the display re-displays the start position farther in the turn direction on the side to which the maneuvering tool has been operated than the machine body in the map screen.

For example, when the machine body approaches a ridge and the start position of the next work travel is calculated on the outside of the field, turning travel toward that start position is not possible. In such a case, the occupant performs operations for turning in the turn direction opposite from the turn direction on the side on which the start position has been calculated, but if the guidance information of the turning travel continues to display information different from the actual turn direction, the turning travel will depend on the occupant's skill. According to this configuration, the guidance information for the turning travel is changed in accordance with the actual turning operations performed by the occupant, and thus even if turning travel is performed in a different turn direction than the turn direction toward the original start position, the occupant can perform turning travel toward a new start position while checking the display.

In a preferred embodiment of the present invention, preferably, the display displays a turning route of the turning travel in the map screen.

According to this configuration, the occupant can use the display to confirm how they should make the turn, which makes the turning operations easier for the occupant.

A traveling work machine according to a preferred embodiment of the present invention alternately and repeatedly performs a plurality of instances of work travel, in which a working device performs work while the traveling work machine automatically travels in a field along a pre-set target heading, and turning travel, in which the traveling work machine moves from an end position of the work travel to a start position of next work travel in an unworked portion of the field while switching to a direction opposite from the travel direction of the work travel. The traveling work machine includes a position detector to obtain position information of a machine body based on a positioning signal of a navigation satellite; a storage capable of storing the position information; an end determiner capable of determining an end of each of a plurality of instances of the work travel; a distance calculator capable of calculating a separation distance between the position information stored in the storage and the position information based on a current position of the machine body; and a display capable of displaying information pertaining to the turning travel. When the end determiner determines the end of the work travel, the distance calculator calculates the separation distance using work travel position information as the position information stored in the storage, the work travel position information being the position information based on the work travel for which the end determiner has determined the end, and the display is capable of displaying the work travel position information and the separation distance.

According to a preferred embodiment of the present invention, the distance calculator calculates the separation distance between the work travel position information and the position information based on the current position of the machine body, and that separation distance can be displayed in the display. Accordingly, even if the turning travel is being performed through manual operations, the occupant can understand the separation distance between the work travel position information and the current position of the machine body by checking the display. Based on this, the occupant can ensure the machine body reaches the start position of the next work travel precisely while checking the display, even if the occupant has not yet developed a sense of the machine body width, the work width, and so on. In other words, the machine body can easily be aligned with the start position regardless of the occupant's skills, which makes the turning travel more efficient. A traveling work machine capable of realizing more efficient turning travel is realized as a result.

In a preferred embodiment of the present invention, preferably, the display displays the machine body and surroundings of the machine body as a map screen, and the work travel position information is displayed in the map screen as a line following the target heading.

According to this configuration, the work travel position information is displayed in the map screen as a line, and thus the occupant can intuitively understand the separation distance between the work travel position information and the current position of the machine body.

In a preferred embodiment of the present invention, preferably, the display displays a distance of a component of the separation distance that is perpendicular or substantially perpendicular to the target heading.

When the work travel and the turning travel are performed alternately and repeatedly as described above, each instance of work travel is performed along the target heading, and thus the routes (or travel trajectories) of the work travel are routes (or travel trajectories) which are parallel or substantially parallel to each other. According to this configuration, only the distance of the component of the separation distance which is perpendicular or substantially perpendicular to the target heading is displayed, which makes it even easier for the occupant to understand the separation distance between the work travel position information and the current position of the machine body.

In a preferred embodiment of the present invention, preferably, the distance calculator calculates the separation distance using the position information from a time when the end determiner determines the end of the work travel.

The position information from the time when the end determiner determines the end of the work travel is the same, or substantially the same, as the position information from the time when the turning travel is started. As such, according to this configuration, the distance calculator calculates the separation distance based on the position where the work travel ends, which further improves the accuracy of the separation distance.

In a preferred embodiment of the present invention, preferably, the display starts displaying the separation distance after the turning travel has started. Additionally, in a preferred embodiment of the present invention, preferably, the display ends the display of the separation distance after the turning travel has ended.

According to this configuration, the separation distance is displayed in the display during the turning travel as needed, which makes the separation distance displayed in the display easy for the occupant to see.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
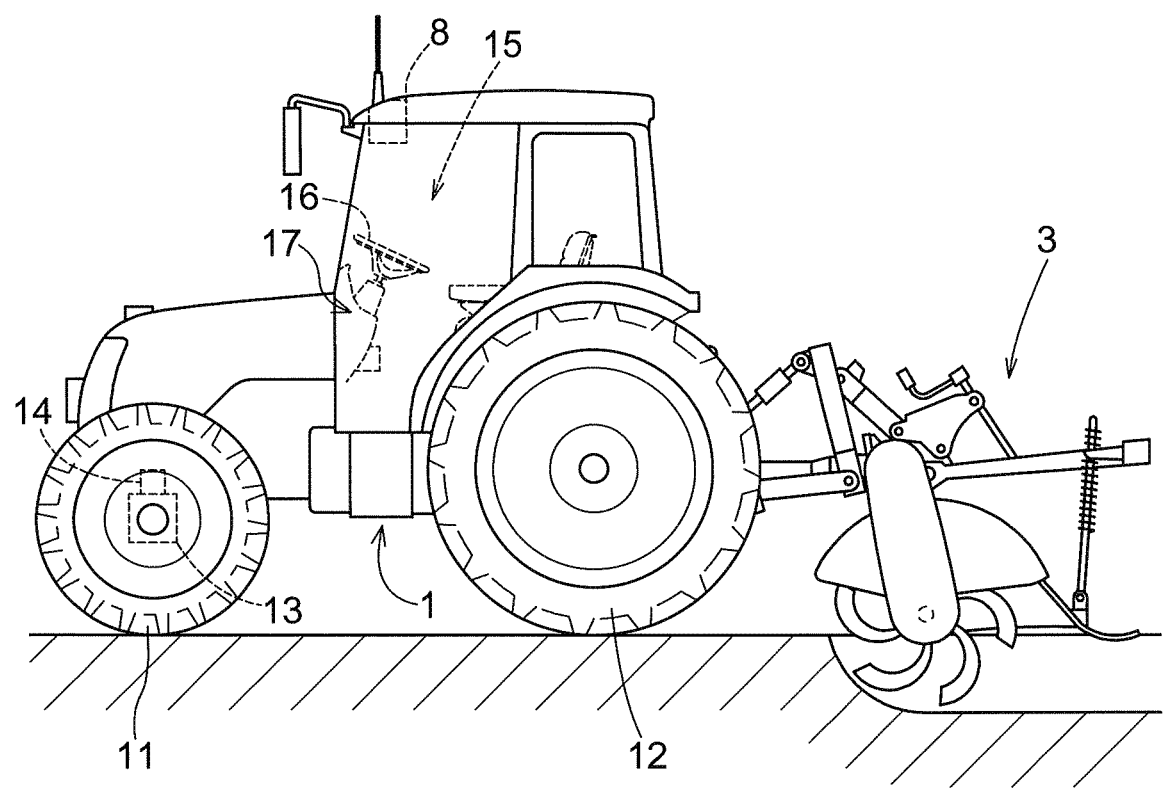
FIG. 1 is a side view of a tractor defining and functioning as a traveling work machine.

Preferred embodiments of traveling work machines according to the present invention will be described. FIG. 1 is a side view of a tractor defining and functioning as an example of the traveling work machine. In this tractor, a cabin part 15 is provided in a central portion of a machine body 1, which is supported by front wheels 11 and rear wheels 12 defining and functioning as a travel apparatus. A rotary tilling device 3, which defines and functions as a working device, is attached to a rear portion of the machine body 1 via a hydraulic raising/lowering mechanism. The front wheels 11 function as maneuvering wheels, and a travel direction of the tractor is changed by changing a steering angle thereof. The steering angle of the front wheels 11 is changed by operating a steering mechanism 13. A steering motor 14 for automatic maneuvering control is included in the steering mechanism 13. A panel assembly 17 is provided in a front portion of the interior of the cabin part 15, and a steering wheel 16 defining and functioning as a maneuvering tool is disposed adjacent to the rear of the panel assembly 17. Although not described in detail, a recessed area is provided at a central location, in the horizontal direction, in a rear portion of the panel assembly 17, and the recessed area is recessed farther into the front of the machine body than left and right side portions of the panel assembly 17. The steering wheel 16 is supported by a steering post 22 that defines and functions as a support member, and a front portion of the steering post 22 with respect to the machine body is located in the recessed area. During manual travel, maneuvering operations of the front wheels 11 are performed by a human operating the steering wheel 16.

In the descriptions of preferred embodiments of the present invention, "maneuvering operations" includes changing the direction of the machine body 1 by changing the direction of the front wheels 11, but if the travel apparatus is a crawler type, changing the direction of the machine body 1 using a speed difference between left and right crawlers is included in the "maneuvering operations".

Figure 2:
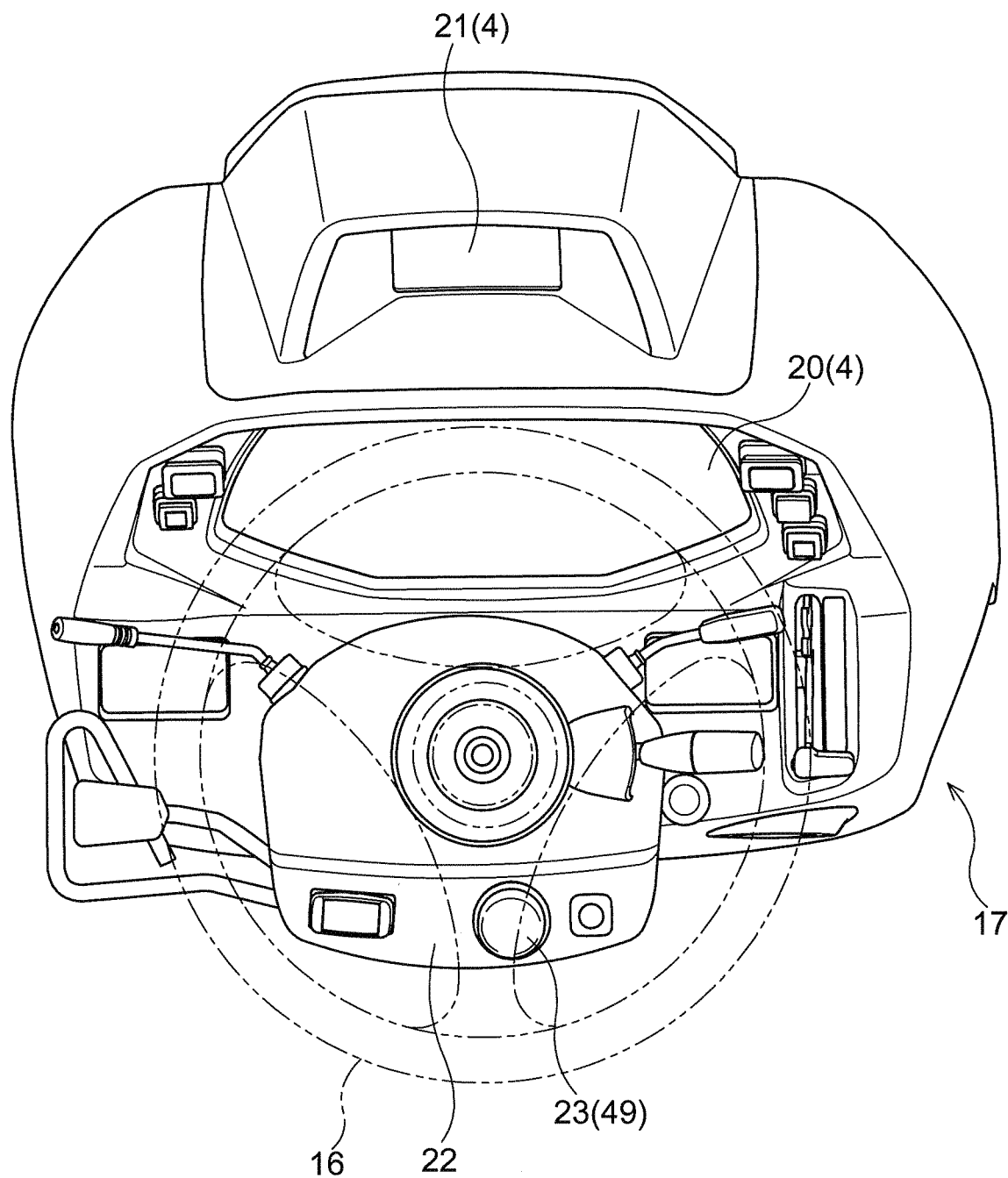
FIG. 2 is a diagram illustrating types of panels in a front portion of the interior of an operator cab.

As illustrated in FIG. 2, a meter panel 20 and a side panel 21 are arranged vertically in the panel assembly 17, and the side panel 21 is disposed higher than the meter panel 20. Information pertaining to the driving of the machine body 1, such as an engine speed, a remaining fuel amount, and so on, is displayed in the meter panel 20. Guidance information for automatic maneuvering control, which will be described later, is displayed in the side panel 21. The meter panel 20 and the side panel 21 are configured as part of a display unit 4 in terms of a configuration for the automatic maneuvering control.

A dial switch 23 is disposed on an upper surface of the steering post 22. The side panel 21 can be operated by using the dial switch 23 as an operating tool, and the dial switch 23 is disposed in an upper portion of the steering post 22 and directly below the steering wheel 16. The dial switch 23 is freely rotatable about an axis extending in the up-down direction (or a direction inclined rearward in a front-back direction of the machine body), and an occupant can switch items of the guidance information displayed in the side panel 21 by rotating the dial switch 23. Additionally, the dial switch 23 can be pressed in a downward direction (or a direction inclined forward in the front-back direction of the machine body). By pressing the dial switch 23, the occupant can perform an operation to accept a setting item, a selected item, or the like pertaining to the guidance information displayed in the side panel 21. This dial switch 23 is also used as a trigger switch 49, which will be described later based on FIG. 3 and the like, and is operated as the trigger switch 49 by the occupant pressing the dial switch 23. The dial switch 23 will be called the "trigger switch 49" hereinafter.

Figure 3:
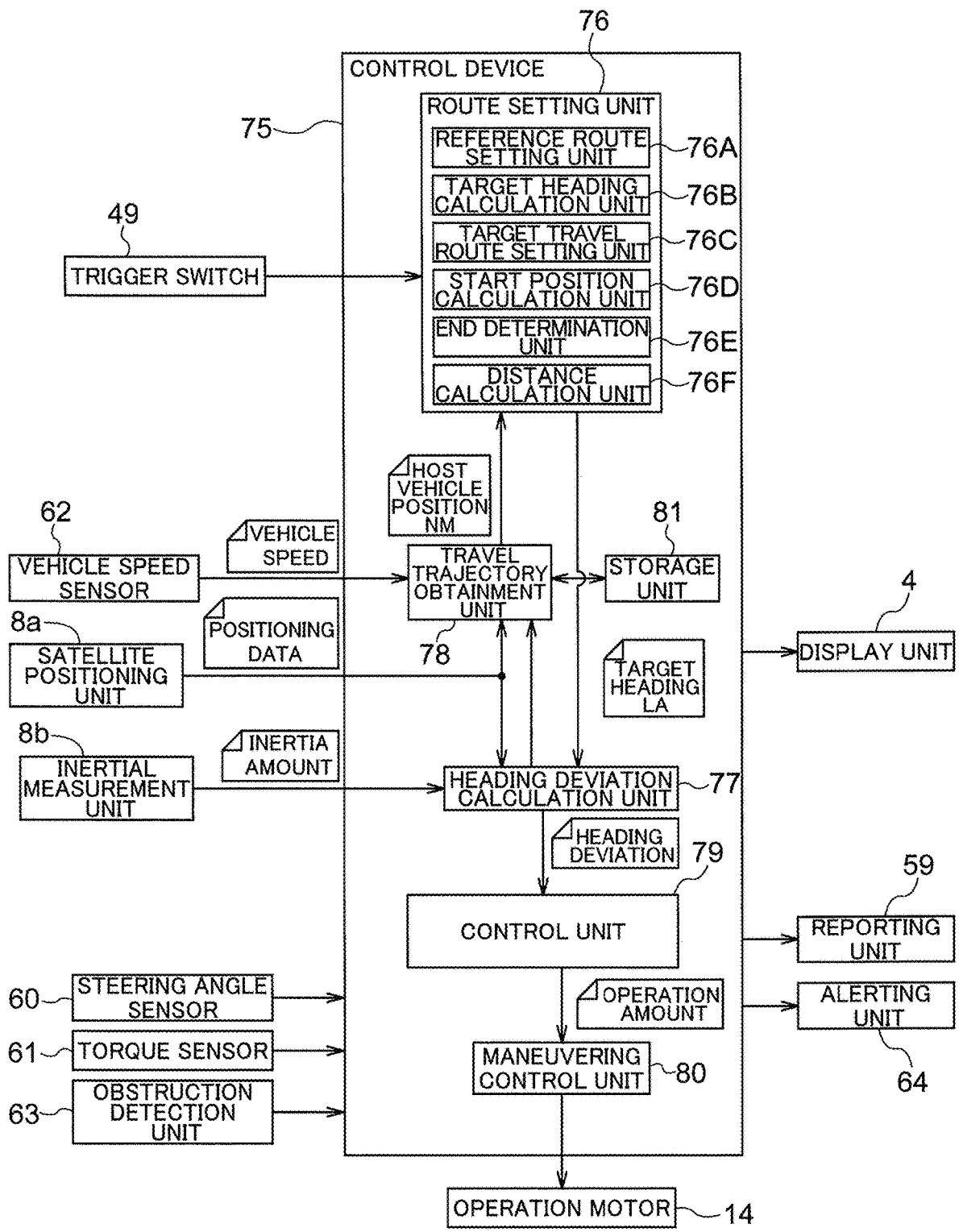
FIG. 3 is a function block diagram illustrating functions for automatic maneuvering control and the flow of data.

A configuration for performing automatic maneuvering control will be described next. As illustrated in FIG. 3, a control device 75 including a large number of electronic control units (called "ECUs") is provided in the machine body 1. The control device 75 is configured or programmed to be capable of switching a control mode to an automatic maneuvering mode in which automatic maneuvering control is executed, and a manual maneuvering mode in which automatic maneuvering control is not executed.

The machine body 1 is provided with a satellite positioning unit 8a, which measures the position of the machine body 1 using GPS (Global Positioning System), which is a well-known technology, as an example of a satellite positioning system (GNSS, or Global Navigation Satellite System) which detects the position of the machine body 1 by receiving radio waves from a satellite. Although the satellite positioning unit 8a uses DGPS (Differential GPS, a relative positioning method) in the present preferred embodiment, it is also possible to use RTK-GPS (Real-Time Kinematic GPS, an interference-based positioning method).

Specifically, the satellite positioning unit 8a, which partially defines a position detection unit 8, is provided in the machine body 1, which is the subject of positioning. The satellite positioning unit 8a uses an antenna to receive radio waves emitted from a plurality of GPS satellites orbiting the earth. The position of the satellite positioning unit 8a is measured based on information in the radio waves received from navigation satellites.

In addition to the satellite positioning unit 8a, the machine body 1 is provided with an inertial measurement unit 8b having, for example, an IMU (Inertial Measurement Unit), as a heading detector to detect a heading of the machine body 1. The inertial measurement unit 8b may include a triaxial gyrosensor, a triaxial accelerometer, or the like. Although not illustrated, the inertial measurement unit 8b is provided in a low location at the center of the machine body 1 in a horizontal width direction, for example. The inertial measurement unit 8b can detect an angular velocity of a turning angle of the machine body 1, and can calculate a change in the azimuth of the machine body 1 by integrating the angular velocity. Accordingly, heading information of the machine body 1 is included in measurement information measured by the inertial measurement unit 8b. Although not described in detail, in addition to the angular velocity of the turning angle of the machine body 1, the inertial measurement unit 8b can also measure an angular velocity of a left-right tilt angle of the machine body 1, a front-back tilt angle of the machine body 1, and the like.

The control device 75 is configured or programmed to include a route setting unit 76, a heading deviation calculation unit 77, a travel trajectory obtainment unit 78, a control unit 79, and a maneuvering control unit 80. The route setting unit 76 sets a target travel route LM along which the machine body 1 is to travel (see FIG. 4, FIG. 8, and the like). The heading deviation calculation unit 77 is configured or programmed to be capable of calculating an angular deviation between a travel heading of the machine body 1 and a target heading LA, i.e., a heading deviation. Based on information of the heading deviation, the control unit 79 calculates and outputs an operation amount such that the machine body 1 travels along the target travel route LM. Besides the information of the heading deviation, the control unit 79 can calculate and output the operation amount based on the position information of the machine body 1 measured by the satellite positioning unit 8a and the heading information of the machine body 1 measured by the inertial measurement unit 8b. The maneuvering control unit 80 controls the steering motor 14 based on the operation amount. Note that the control unit 79 and the maneuvering control unit 80 may be configured in an integrated manner.

The trigger switch 49 is provided as an operating tool to set the target travel route LM used in the automatic maneuvering control (see FIG. 4, FIG. 8, and the like) and starting the automatic maneuvering control. Although details will be given later, the target travel route LM is set based on the target heading LA (see FIG. 4), and the target heading LA is calculated based on a travel trajectory along which the machine body 1 has traveled in the field in advance. A start position Ts (see FIG. 4) and an end position Tf (see FIG. 4) are set by operating the trigger switch 49 in travel performed to obtain the travel trajectory. Note that the trigger switch 49 need not be a single switch, and may instead be configured such that a switch to set the start position Ts and a switch to set the end position Tf are arranged side-by-side.

Information from the satellite positioning unit 8a, the inertial measurement unit 8b, the trigger switch 49 defining and functioning as an operating tool, a steering angle sensor 60 defining and functioning as a maneuvering operation detector, a torque sensor 61, a vehicle speed sensor 62, an obstruction detection unit 63, and the like is input to the control device 75. The vehicle speed sensor 62 is configured or programmed to be capable of detecting the vehicle speed from the rotational speed of a transmission shaft in a transmission mechanism for the rear wheels 12. Note that the vehicle speed may be detected not only by the vehicle speed sensor 62, but also using a positioning signal of the satellite positioning unit 8a. The obstruction detection unit 63 is provided on both a front portion and left and right side portions of the machine body 1, and is configured or programmed to be capable of detecting a ridge of the field, metal poles in the field, and so on using an electro-optical range-finding sensor, an image sensor, or the like, for example. When an obstruction is detected by the obstruction detection unit 63, an alert is issued to the occupant using an alerting unit 64, which uses a buzzer, audio guidance, or the like, for example. The control device 75 is also connected to a reporting unit 59, and the reporting unit 59 is configured or programmed to report on states such as the vehicle speed, the engine speed, and the like, for example. The reporting unit 59 is configured or programmed to be displayed on the display unit 4, for example. Furthermore, the alerting unit 64 may be configured or programmed to display the alert in the display unit 4 via the reporting unit 59. In this case, an alert that a ridge has been detected, for example, is displayed on the display unit 4. The alerting unit 64 may also be configured or programmed to be part of the reporting unit 59. The display unit 4 is configured or programmed to be capable of displaying, on a screen, a variety of information based on signal inputs from the reporting unit 59, the alerting unit 64, and the like. The display unit 4 is also configured or programmed to be capable of displaying various types of guidance information according to conditions of straight travel, conditions of turning travel, and the like of the machine body 1.

The heading deviation calculation unit 77 calculates an angular deviation between a detected heading of the machine body 1, detected by the satellite positioning unit 8a and the inertial measurement unit 8b, and a target heading LA in the target travel route LM, i.e., calculates the heading deviation. Then, when the control device 75 is set to the automatic maneuvering mode, the control unit 79 calculates and outputs an operation amount to control the steering motor 14 so as to reduce the angular deviation. In this manner, the maneuvering control unit 80 is configured or programmed to be capable of controlling the maneuvering of the machine body 1 so as to follow the target heading LA.

The travel trajectory obtainment unit 78 calculates a position of the machine body 1, i.e., a host vehicle position NM, based on the positioning signal measured by the satellite positioning unit 8a, the heading of the machine body 1 calculated by the heading deviation calculation unit 77, and the vehicle speed detected by the vehicle speed sensor 62. A storage unit 81 is configured or programmed to be capable of storing the host vehicle position NM as position information. The travel trajectory obtainment unit 78 stores the host vehicle position NM in the storage unit 81, which may be constituted by RAM (Random Access Memory), for example, as time passes. The travel trajectory obtainment unit 78 is also configured or programmed to be capable of obtaining a travel trajectory based on an aggregation of host vehicle positions NM stored in the storage unit 81. In sum, the travel trajectory obtainment unit 78 is configured or programmed to be capable of obtaining the travel trajectory of the machine body 1 based on the detection, over time, of the host vehicle position NM defining and functioning as position information.

The operation amount is calculated by the control unit 79 based on information on the heading deviation. The maneuvering control unit 80 executes the automatic maneuvering control based on the operation amount calculated by the control unit 79 during the automatic maneuvering control of the machine body 1. In other words, the steering motor 14 is operated such that the detection position of the machine body 1 as detected by the satellite positioning unit 8a and the inertial measurement unit 8b (the host vehicle position NM) is located on the target travel route LM.

In the present preferred embodiment, the control signal may be the operation amount output by the control unit 79, or may be a voltage value, a current value, or the like with which the maneuvering control unit 80 operates the steering motor 14.

A reference route setting unit 76A, a target heading calculation unit 76B, and a target travel route setting unit 76C are included in the route setting unit 76. As illustrated in FIG. 3, a reference route corresponding to a target route for automatic maneuvering is set by the reference route setting unit 76A through reference route setting processing based on operations of the trigger switch 49. The target heading calculation unit 76B calculates the target heading LA based on a heading aligned with a lengthwise direction of the reference route. The target travel route setting unit 76C is configured or programmed to be capable of generating the target travel route LM following the target heading LA, using the reference route and the target heading LA as a reference. To generate the target travel route LM, a start position calculation unit 76D, an end determination unit 76E, and a distance calculation unit 76F are included in the route setting unit 76. The start position calculation unit 76D, the end determination unit 76E, and the distance calculation unit 76F will be described later. Note that the reference route setting unit 76A and the target heading calculation unit 76B may be configured in an integrated manner.

Figure 4:
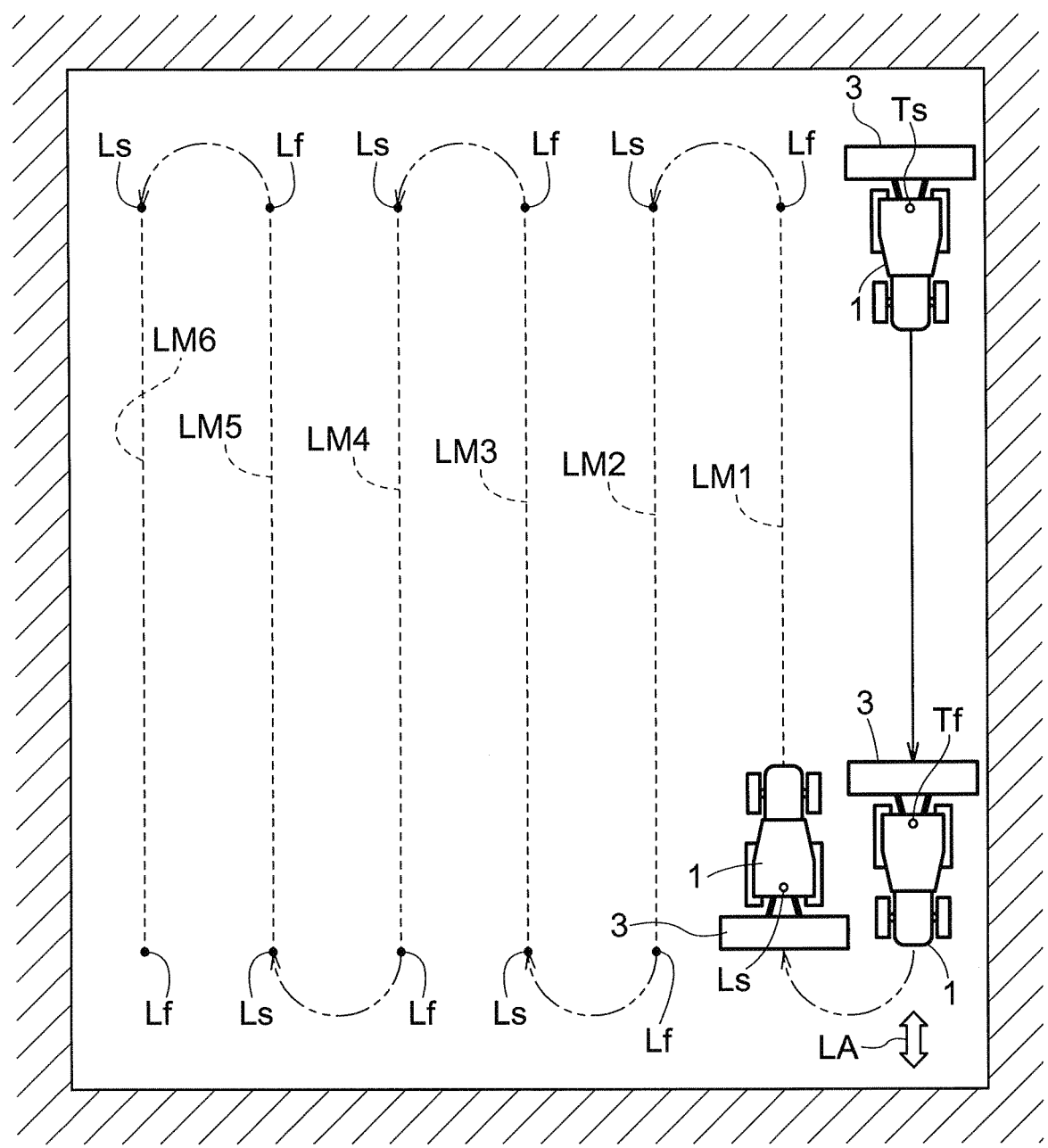
FIG. 4 is a plan view of a field, schematically illustrating a travel route in tilling work performed by the tractor.

FIG. 4 schematically illustrates an example of tilling work performed by the tractor. In this tilling work, work travel, in which the tractor moves forward along a linear work route while performing actual tilling work, and turning travel, in which the tractor turns to move to the next linear work route, are alternately and repeatedly performed multiple times. At this time, the first linear work route is a reference route which is steered manually, and the following linear routes are set in sequence by the route setting unit 76 so as to be arranged side-by-side along the reference route. These routes correspond to the target travel route LM for automatic maneuvering control, and a plurality of target travel routes LM1 to LM6 are indicated in FIG. 4. Work travel involving automatic maneuvering control is performed in each of the target travel routes LM1 to LM6. When traveling between each of the target travel routes LM1 to LM6, the machine body 1 moves from an end position Lf of the work travel to a start position Ls of the next work travel in an unworked portion of the field while reversing in the opposite direction from the travel direction of the work travel.

First, the reference route is generated. The occupant manually moves the machine body 1 to a ridge at one corner within the field. When the machine body 1 reaches the ridge at the corner, the occupant operates the trigger switch 49. The position at the time when the occupant operates the trigger switch 49 is registered as the start position Ts by the reference route setting unit 76A. After the registration of the start position Ts, the occupant performs manual operations to move the machine body 1 straight (or substantially straight) from the start position Ts along the ridge on one side of the field. During this period, the host vehicle position NM is calculated by the travel trajectory obtainment unit 78 as time passes and is stored in the storage unit 81. Then, after the machine body 1 has moved straight (or substantially straight) from one end to the other end of the ridge on the one side, the occupant stops the machine body 1 and operates the trigger switch 49 again. The position at the time when the occupant operates the trigger switch 49 again is registered as the end position Tf by the reference route setting unit 76A. The travel trajectory obtainment unit 78 obtains the travel trajectory based on an aggregate of the host vehicle positions NM between the start position Ts and the end position Tf, and the reference route setting unit 76A calculates the reference route between the start position Ts and the end position Tf based on that travel trajectory. When the machine body 1 travels along the target travel route LM, the direction which follows the reference route becomes the target heading LA.

Note that the travel of the machine body 1 from the start position Ts to the end position Tf may be work travel involving tilling work, or may be travel in a non-work state. When positional coordinates of the reference route are set, automatic maneuvering control can be performed in at least a portion of the reference route.

After the setting of the reference route is complete, the occupant moves the machine body 1 to the start position Ls in a target region for the first work travel in the field. In the preferred embodiment illustrated in FIG. 4, the target region for the first work travel is adjacent to the reference route, and thus the occupant performs turning travel for reversing the travel direction of the machine body 1 by 180 degrees in order to move the machine body 1 to the start position Ls. At this time, the control unit 79 can determine that the machine body 1 has turned due to the heading of the machine body 1 being reversed. The heading of the machine body 1 reversing can be detected by the satellite positioning unit 8a, the inertial measurement unit 8b, or the like. Aside from the heading of the machine body 1 reversing, the turning of the machine body 1 may be determined by operations of various devices. As the operations of various devices, for example, a PTO shaft clutch may be configured or programmed to be manipulated in and out. Additionally, the machine body 1 reaching the start position Ls may be determined by the satellite positioning unit 8a.

After this turning travel is complete, the manual maneuvering mode of the control device 75 is continued, and the occupant causes the machine body 1 to travel along the target heading LA through manual operations. During this period, the control device 75 confirms determination conditions for the heading deviation of the machine body 1 calculated by the heading deviation calculation unit 77, the direction of the front wheels 11, the steering angle of the steering wheel 16, and the like, and determines whether or not the state of the machine body 1 is a state suitable for the next tilling work. Whether or not the state of the machine body 1 is suitable for tilling work is determined, for example, using a position distanced from the pre-turning travel position by an integral multiple of a work width in a direction perpendicular or substantially perpendicular to the target heading LA as a reference position, and is determined based on whether or not travel misalignment with respect to the reference position in the left-right direction of the machine body 1 is within a permissible range. If the travel misalignment is outside of the permissible range, the occupant manually steers the machine body 1 so that the travel misalignment of the machine body 1 enters the permissible range.

The heading deviation of the machine body 1 with respect to the target heading LA being significantly high, the steering wheel 16 being repeatedly steered to the left and right so that the position of the steering wheel 16 fails to stabilize, the vehicle speed of the machine body 1 being too fast or too slow, and so on can be given as examples of states not suitable for tilling work. The detection accuracy of the position detection unit 8 being lower than a pre-set threshold can also be given as an example of a state not suitable for tilling work.

When the control device 75 determines that the state of the machine body 1 is a state suitable for the next tilling work, the automatic maneuvering control can be performed by operating the trigger switch 49. In other words, the target travel route LM1 is set by the target travel route setting unit 76C, and the work travel is started, in response to the occupant operating the trigger switch 49. When the work travel is started, the automatic maneuvering control is performed so that the machine body 1 travels along the target travel route LM1. The target travel route LM1 is a target travel route LM which is set to a heading that follows the target heading LA, and in which the machine body 1 performs the first work travel after the setting of the reference route. While the automatic maneuvering control is performed, automatic steering is performed through operations by the steering mechanism 13, and the vehicle speed of the machine body 1 is also automatically adjusted. Note, however, that the configuration may be such that the vehicle speed of the machine body 1 can be adjusted through human operations made by the occupant even while automatic maneuvering control is being performed.

When the automatic maneuvering control performed along the target travel route LM1 ends, the occupant continues manual steering until, through the above-described turning travel, the state of the machine body 1 becomes a state suitable for the next tilling work. If the trigger switch 49 is permitted to be operated, the occupant operates the trigger switch 49, and the target travel route setting unit 76C sets the target travel route LM2 for the next time to a heading following the target heading LA. Then, the automatic maneuvering control is performed so that the machine body travels along the target travel route LM2. Thereafter, the turning travel, the setting of the target travel route LM, and the work travel are repeated through the above-described process, in order of the target travel routes LM3, LM4, LM5, and LM6.

Figure 5:
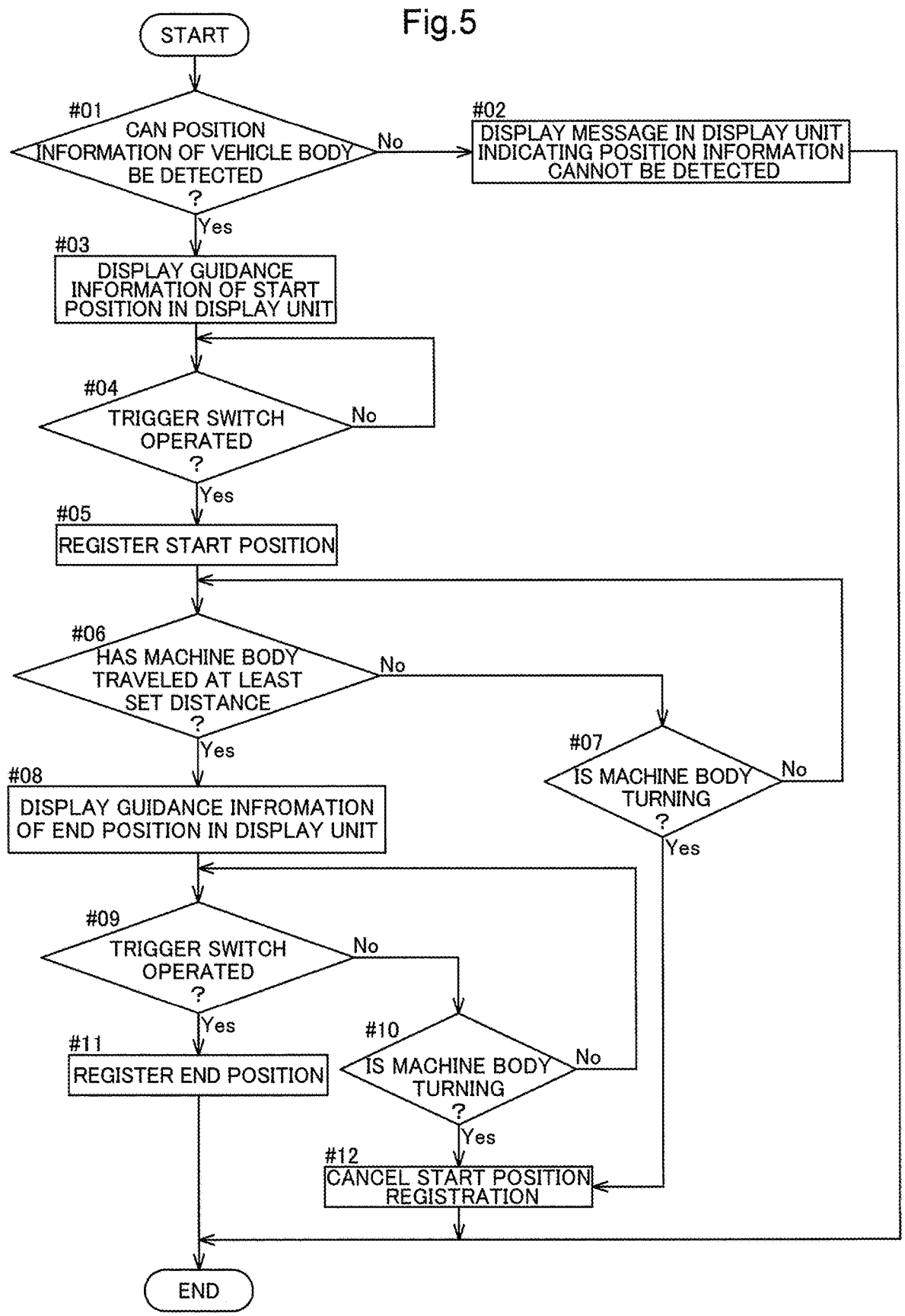
FIG. 5 is a flowchart illustrating processing for generating a reference route.
Figure 6:
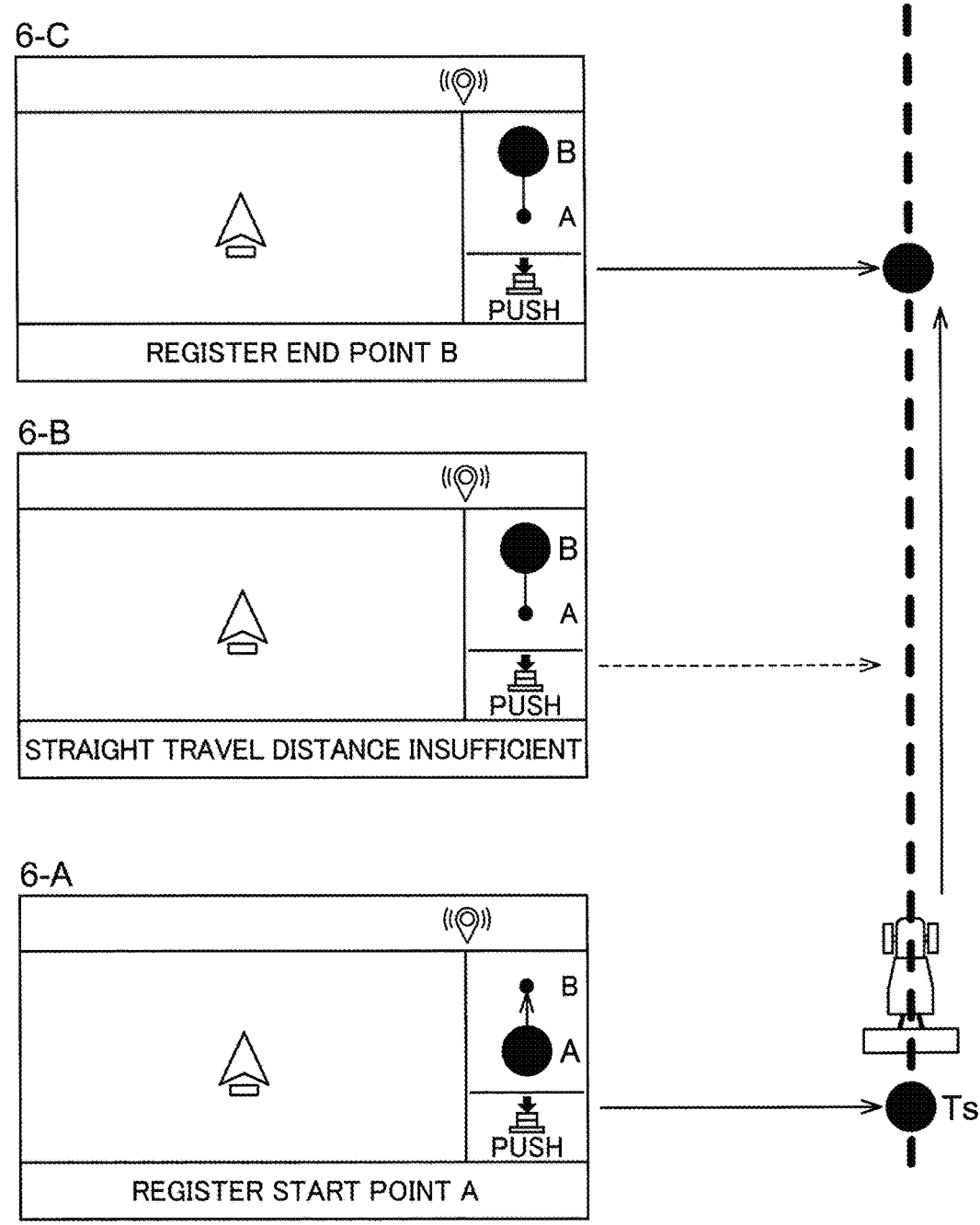
FIG. 6 is a descriptive diagram illustrating guidance information when generating the reference route.

The display of guidance information pertaining to reference route generation will be described based on FIG. 3, FIG. 5, and FIG. 6. The reference route setting unit 76A generates the reference route based on the flowchart illustrated in FIG. 5. Before the generation of the reference route, the route setting unit 76 determines whether or not the position information of the machine body 1 can be detected by the position detection unit 8 (step #01). If the position information of the machine body 1 is not detected (step #01: No), a message indicating that the detection is not possible is displayed on the display unit 4 (step #02), and the reference route is not generated. In this manner, when the accuracy of the obtainment of the position information by the position detection unit 8 is at least a pre-set accuracy, the reference route setting unit 76A can set the start position Ts through an operation of the trigger switch 49, which defines and functions as an operating tool.

If the position information of the machine body 1 is detected (step #01: Yes), guidance information for the start position Ts, such as that indicated by 6-A in FIG. 6, is displayed on the display unit 4 (step #03), and the start position Ts can be registered. The guidance information indicated by 6-A, 6-B, and 6-C in FIG. 6 are displayed in the side panel 21 illustrated in FIG. 2. Note, however, that the guidance information may be displayed in the meter panel 20 illustrated in FIG. 2. In the guidance information for the start position Ts indicated by 6-A in FIG. 6, the start position Ts is displayed as "start point A". A state where the guidance information for the start position Ts is displayed on the display unit 4 is a standby state for an operation of the trigger switch 49 (step #04). When the trigger switch 49 is operated (step #04: Yes), the reference route setting unit 76A registers the start position Ts (the start point A) (step #05).

After the registration of the start position Ts, the occupant moves the machine body 1 forward through manual operations. Then, the reference route setting unit 76A determines whether or not the machine body 1 has traveled at least a pre-set distance by calculating the distance between the start position Ts and the host vehicle positions NM as time passes (step #06). If the travel distance of the machine body 1 has not reached the set distance (step #06: No), guidance information indicating that the travel distance has not reached the set distance is displayed on the display unit 4, even if the occupant operates the trigger switch 49. As the guidance information indicating that the travel distance has not reached the set distance, for example, a message reading "insufficient forward travel distance" is displayed, as indicated by 6-B in FIG. 6. In this manner, the reference route setting unit 76A can, through an operation of the trigger switch 49, set the end position Tf (an end point B) after the start position Ts (the start point A) has been set by the trigger switch 49 being operated as an operating tool and after the machine body 1 has traveled a pre-set distance following the setting of the start position Ts.

While the machine body 1 is moving forward as a result of the manual operations, the reference route setting unit 76A determines whether or not the machine body 1 is turning (step #07). A change amount in the maneuvering operations based on operation of the steering wheel 16 is detected by the steering angle sensor 60. The configuration is such that the turning of the machine body 1 can be determined by detecting that the change amount in the maneuvering operations based on the detection by the steering angle sensor 60 has exceeded a pre-set range. Additionally, the heading deviation calculation unit 77 can calculate a turning heading of the machine body 1 based on a positioning signal from the satellite positioning unit 8*a*, an inertia signal from the inertial measurement unit 8*b*, or the like. Then, when the reference route setting unit 76A determines that the machine body 1 is turning (step #07: Yes), the registration of the start position Ts is canceled and the generation of the reference route is aborted (step #12). At this time, guidance information indicating that the generation of the reference route has been aborted, e.g., a message reading "a turn has been detected and the generation of the reference route will end. Please generate the reference route again", is displayed on the display unit 4. In this manner, when, after the start position Ts (the start point A) has been set by operating the trigger switch as an operating tool, the change amount in the maneuvering operations is detected as having exceeded a pre-set amount without the trigger switch 49 being operated, the setting of the start position Ts is canceled.

If the travel distance of the machine body 1 has reached the set distance (step #06: Yes), guidance information for the end position Tf, such as that indicated by 6-C in FIG. 6, is displayed on the display unit 4 (step #08), and the end position Tf can then be registered. In the guidance information for the end position Tf indicated by 6-C in FIG. 6, the end position Tf is displayed as the "end point B". A state where the guidance information for the end position Tf is displayed on the display unit 4 is a standby state for an operation of the trigger switch 49 (step #09). In this manner, when the end position Tf (the end point B) can be set by operating the trigger switch 49 as an operating tool, the display unit 4 displays an indication that the end position Tf can be set.

When the trigger switch 49 is operated (step #09: Yes), the reference route setting unit 76A registers the end position Tf (step #11). The reference route is generated, and the target heading LA is calculated, through the foregoing steps. In this manner, the reference route setting unit 76A sets the reference route based on the travel trajectory of the machine body 1. Additionally, the trigger switch 49 defining and functioning as the operating tool is configured or programmed to be capable of setting both the start position Ts (the start point A) and the end position Tf (the end point B) when setting the reference route.

While waiting for the trigger switch 49 to be operated (step #09: No), the reference route setting unit 76A determines whether or not the machine body 1 is turning through the same method as in step #07 (step #11). When it is determined that the machine body 1 is turning (step #11: Yes), as described above, the registration of the start position Ts is canceled and the generation of the reference route is aborted (step #12), and guidance information indicating that the generation of the reference route has been aborted is displayed on the display unit 4.

Figure 8:
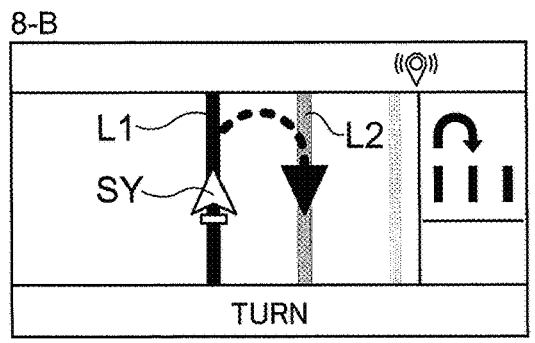
FIG. 8 is a descriptive diagram illustrating the guidance information at the time of turning travel.
Figure 8:
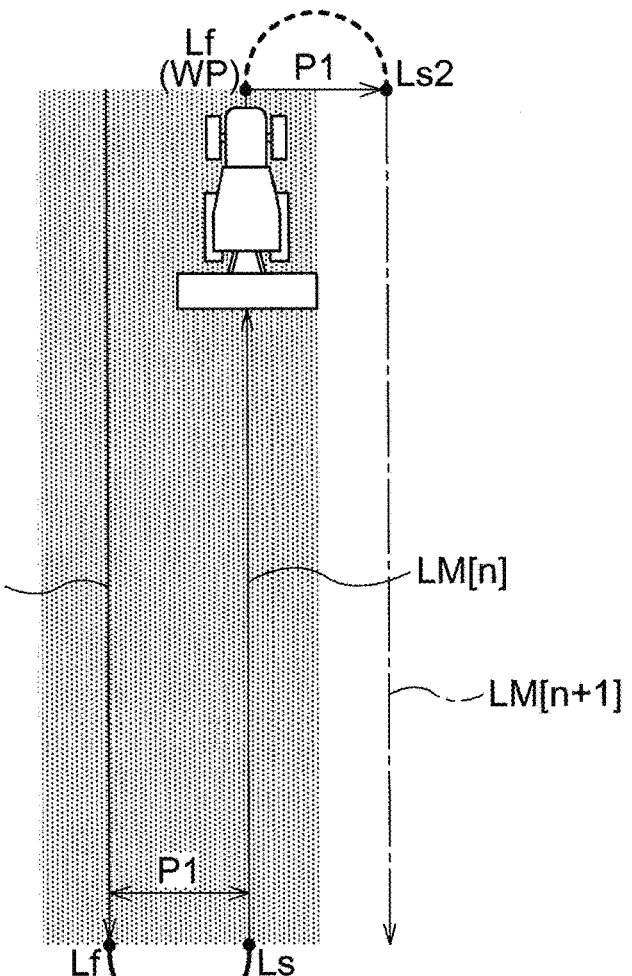
Figure 8:
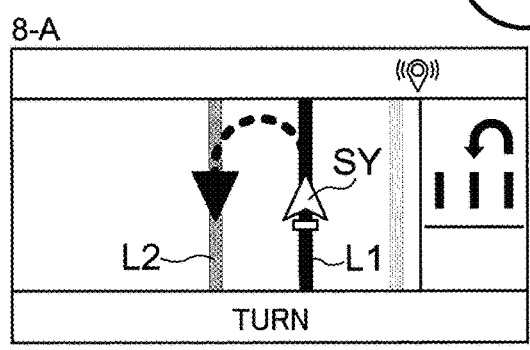
Figure 9:
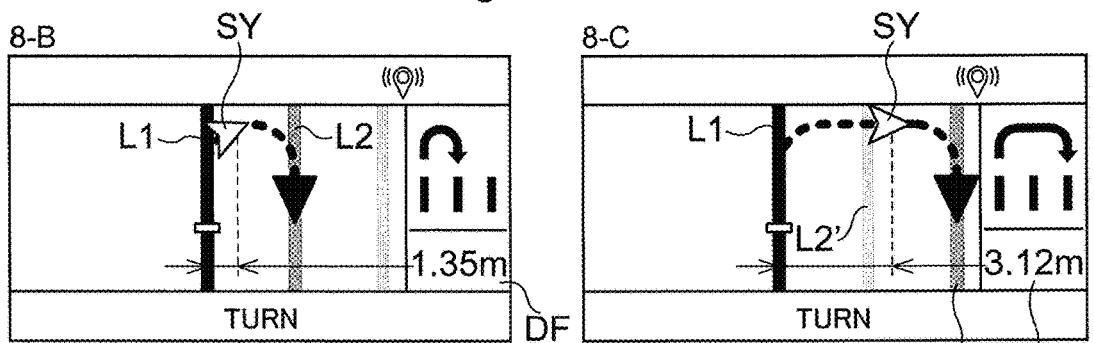
FIG. 9 is a descriptive diagram illustrating the guidance information at the time of turning travel.
Figure 9:
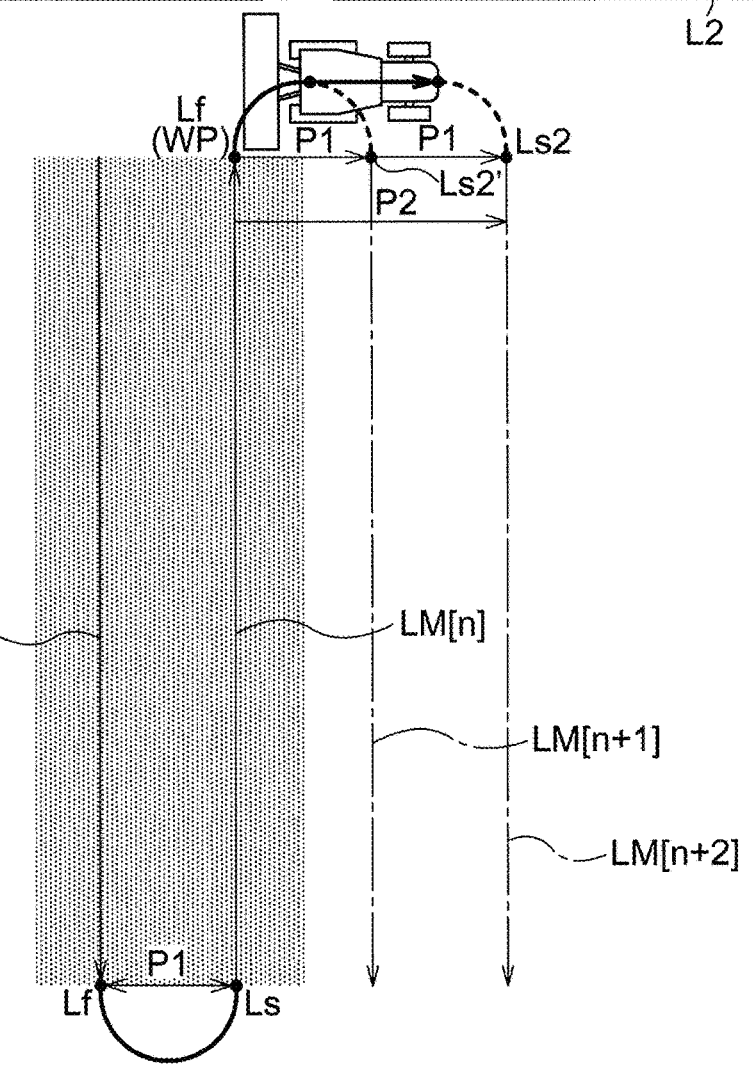
Figure 9:
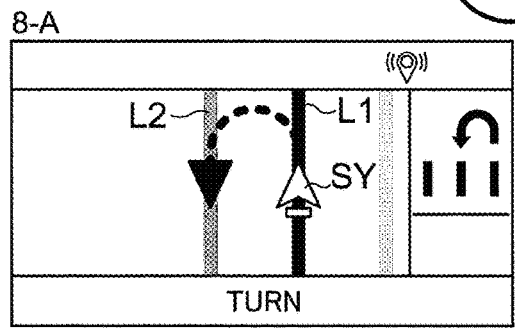

The display of guidance information in turning travel will be described based on FIG. 7 and FIG. 11. As illustrated in FIG. 8, when turning travel is performed after the completion of automatic maneuvering control along the target travel route LM, guidance information pertaining to the turning travel is displayed on the display unit 4. The guidance information for a left turn, indicated by 8-A in FIG. 8 and FIG. 9, is displayed on the display unit 4 after automatic travel control along the target travel route LM[n−1] has been performed. Additionally, the guidance information for a right turn, indicated by 8-B in FIG. 8 and FIG. 9, is displayed on the display unit 4 after automatic travel control along the target travel route LM[n] has been performed. A map screen showing the machine body 1 and the surroundings of the machine body 1 is included in this guidance information. Additionally, although this guidance information is displayed in the side panel 21 illustrated in FIG. 2, the guidance information may be displayed in the meter panel 20 illustrated in the same drawing.

As illustrated in FIG. 3, the start position calculation unit 76D, the end determination unit 76E, and the distance calculation unit 76F are included in the route setting unit 76. FIG. 7 illustrates a flowchart pertaining to the display of the guidance information pertaining to the turning travel, and processing based on this flowchart is performed by the control device 75.

The end determination unit 76E determines whether or not the automatic maneuvering control for traveling along the target travel route LM has ended (step #21). The end of the automatic maneuvering control is determined, for example, based on whether or not a PTO clutch lever (not shown), a pumper lever (not shown), or the like has been operated. When the end determination unit 76E determines that the automatic maneuvering control has ended (step #21: Yes), the host vehicle position NM at the point in time of the determination that the automatic maneuvering control has ended is stored in the storage unit 81 as the end position Lf (step #22). The end position Lf is used as work travel position information WP through which the start position calculation unit 76D calculates the start position Ls2 of the next work travel. Note that of the end positions Lf illustrated in FIG. 8 to FIG. 11, the end position Lf of the target travel route LM[n] is also indicated as the work travel position information WP used to calculate the start position Ls2 of the next work travel. The present specification assumes that the start position Ls2 will be calculated thereafter by the start position calculation unit 76D, and is therefore described as being distinct from the start position Ls.

Information pertaining to the previous turning travel is stored in the storage unit 81. The start position calculation unit 76D is configured or programmed to be capable of determining whether the previous turning travel was a right turn or a left turn by reading out data pertaining to the turning travel from the storage unit 81. As illustrated in FIG. 4, when the machine body 1 repeats the automatic maneuvering control along the target heading LA, the turning travel at the ridges of the field typically alternates between a right turn and a left turn. As such, the start position calculation unit 76D determines whether the previous turning travel was a right turn or a left turn (step #23). Note that the configuration may be such that the determination in step #23 is performed by a module aside from the start position calculation unit 76D. When the previous turning travel was a right turn (step #23: right turn), the start position calculation unit 76D calculates the next start position Ls2 on a left turn side based on the previous turning travel, before the machine body 1 starts the turn (step #25-1). Guidance information for a left turn is then displayed on the display unit 4 (step #25-2), and a display line L2 based on the start position Ls2 is also displayed in the guidance information. On the other hand, when the previous turning travel was a left turn (step #23: left turn), the start position calculation unit 76D calculates the next start position Ls2 on a right turn side based on the previous turning travel, before the machine body 1 starts the turn (step #24-1). Guidance information for a right turn is then displayed on the display unit 4 (step #24-2), and a display line L2 based on the start position Ls2 is also displayed in the guidance information.

In this manner, when the end determination unit 76E determines that the work travel has ended, the start position calculation unit 76D calculates the start position Ls2 on the right or the left of the travel direction of the machine body 1 in the work travel based on the work travel position information WP defining and functioning as position information, and the display unit 4 displays guidance information used to guide the turning travel to the start position Ls2. At this time, when the start position Ls has been calculated in one of the left- or right-side turn directions with respect to the travel direction in the previous turning travel, the start position calculation unit 76D calculates the start position Ls2 in the other of the left- or right-side turn directions relative to the travel direction in the current turning travel, and the display unit 4 displays the display line L2, based on the start position Ls2, further on the other of the left and right sides than the machine body 1 in the map screen.

After the guidance information has been displayed on the display unit 4 through the process of step #24-2 or step #25-2, the occupant turns the machine body 1 by operating the steering wheel 16. The control device 75 is configured or programmed so that the turn direction at this time can be determined by the steering angle sensor 60 defining and functioning as a maneuvering operation detector (step #24-3, step #25-3). Note that the determination of the turn direction is not limited to a determination made by the steering angle sensor 60, and may be, for example, a determination based on an aggregation of the position information of the machine body 1 measured by the satellite positioning unit 8a, a determination based on the heading information of the machine body 1 measured by the inertial measurement unit 8b, or the like. In other words, the maneuvering operation detector may be a configuration in which the maneuvering operations is detected by, for example, the satellite positioning unit 8a or the inertial measurement unit 8b detecting a turn.

If the actual turn direction of the machine body 1 differs from the guidance information displayed on the display unit 4, the guidance information displayed on the display unit 4 is changed to guidance information which corresponds to the actual turn direction of the machine body 1. When the actual turn direction of the machine body 1 is a left turn (step #24-3: left turn) in a state where guidance information for a right turn is displayed on the display unit 4 (step #24-2), the start position calculation unit 76D calculates the next start position Ls2 on the left turn side (step #24-4). Then, the guidance information in the display unit 4 is changed to guidance information for a left turn (step #24-5). On the other hand, when the actual turn direction of the machine body 1 is a right turn (step #25-3: right turn) in a state where guidance information for a left turn is displayed on the display unit 4 (step #25-2), the start position calculation unit 76D calculates the next start position Ls2 on the right turn side (step #25-4). Then, the guidance information in the display unit 4 is changed to guidance information for a right turn (step #25-5). In this manner, when, in turning travel, the steering wheel 16 (the maneuvering tool) is operated in the turn direction to the side opposite from the side on which the start position calculation unit 76D has calculated the start position Ls2, the start position calculation unit 76D re-calculates the start position Ls2 in the turn direction on the side toward which the steering wheel 16 has been operated, and the display unit 4 re-displays the start position Ls2 in the map screen, farther than the machine body 1 toward the side corresponding to the turn direction in which the steering wheel 16 has been operated.

Before describing step #26 and on, a method by which the start position calculation unit 76D calculates the start position Ls2 will be described. In the preferred embodiment illustrated in FIG. 8, after the automatic travel control is performed along the target travel route LM[n], the host vehicle position NM at the point in time when the end of the automatic maneuvering control was determined is stored in the storage unit 81 as the end position Lf of the target travel route LM[n] (the work travel position information WP) based on step #22 in FIG. 7. Before the automatic maneuvering control in the target travel route LM[n], a left turn is made from the end position Lf of the target travel route LM[n−1] to the start position Ls of the target travel route LM[n]. Accordingly, a right turn is determined in step #23 of FIG. 7 before the machine body 1 turns from the end position Lf of the target travel route LM[n], i.e., the work travel position information WP.

In the preferred embodiment illustrated in FIG. 8, the end position Lf of the target travel route LM[n−1] and the start position Ls of the target travel route LM[n] are separated by a first separation distance P1. An area of work travel based on the target travel route LM[n−1] and an area of work travel based on the target travel route LM[n] are areas which are adjacent to each other. Based on this, the first separation distance P1 is a distance equivalent to the work width of the tilling device 3 attached to the tractor via a PTO shaft, or a distance around ten percent smaller than the work width of the tilling device 3, for example. In FIG. 9 and FIG. 11 too, which will be described later, the first separation distance P1 is as described based on FIG. 8. When the first separation distance P1 is a distance smaller than the work width of the tilling device 3, the work width of the work travel based on the target travel route LM[n−1] and the work width of the work travel based on the target travel route LM[n] overlap by a predetermined width (less than ten percent of the work width, for example).

The end position Lf of the target travel route LM[n−1] is a position where the previous turning travel was started. The start position Ls of the target travel route LM[n] is a position where the previous turning travel ended. Furthermore, the end position Lf of the target travel route LM[n−1] and the start position Ls of the target travel route LM[n] are separated by the first separation distance P1. Based on this, the start position calculation unit 76D estimates that the next automatic maneuvering control will be performed at a position separated from the target travel route LM[n] in the horizontal direction (a direction orthogonal to the target heading LA; the same applies hereinafter) by the first separation distance P1. The start position calculation unit 76D then calculates the start position Ls2 for new work travel on a side opposite to where the target travel route LM[n−1] is located, in the horizontal direction, with respect to the work travel position information WP, the start position Ls2 for new work travel being separated from the work travel position information WP by the first separation distance P1 (step #25-1). A target travel route LM[n+1] illustrated in FIG. 8 is a planned target travel route LM set after the machine body 1 has reached the start position Ls2.

Then, based on the process of step #25-2, guidance information for the right turn indicated by 8-B in FIG. 8 is displayed on the display unit 4 as the map screen. In this manner, the display unit 4 displays the surroundings of the machine body 1, including the machine body 1, as the map screen. The work travel position information WP and the start position Ls2 of the next work travel are displayed in this map screen as linear display lines L1 and L2, respectively, which follow the target heading LA.

In this manner, the start position calculation unit 76D calculates the start position Ls2 based on the separation distance between the position where the previous turning travel started and the position where the previous turning travel ended, and the display unit 4 displays the start position Ls2, calculated based on the separation distance, in the guidance information.

As illustrated in FIG. 8 and FIG. 9, a machine body symbol SY and a turning route indicated by a broken line are schematically indicated in the map screen in the guidance information displayed on the display unit 4. While the machine body 1 is performing turning travel, the machine body symbol SY indicating the position of the machine body 1 moves along the turning route indicated by the broken line, as indicated in the guidance information for 8-B and 8-C in FIG. 9. Although the display unit 4 displays the turning route of the turning travel in the map screen, the turning route is not set in advance in the present preferred embodiment, and the turning route indicated by the broken line is displayed in the map screen as a guide for reaching the start position Ls2. The machine body symbol SY is displayed as a guide in any desired location on the turning route indicated by the broken line, based on the host vehicle position NM calculated by the travel trajectory obtainment unit 78. Additionally, the orientation of the machine body symbol SY changes in the map screen in the guidance information based on a turning heading calculated by the heading deviation calculation unit 77 (see FIG. 3).

Figure 7:
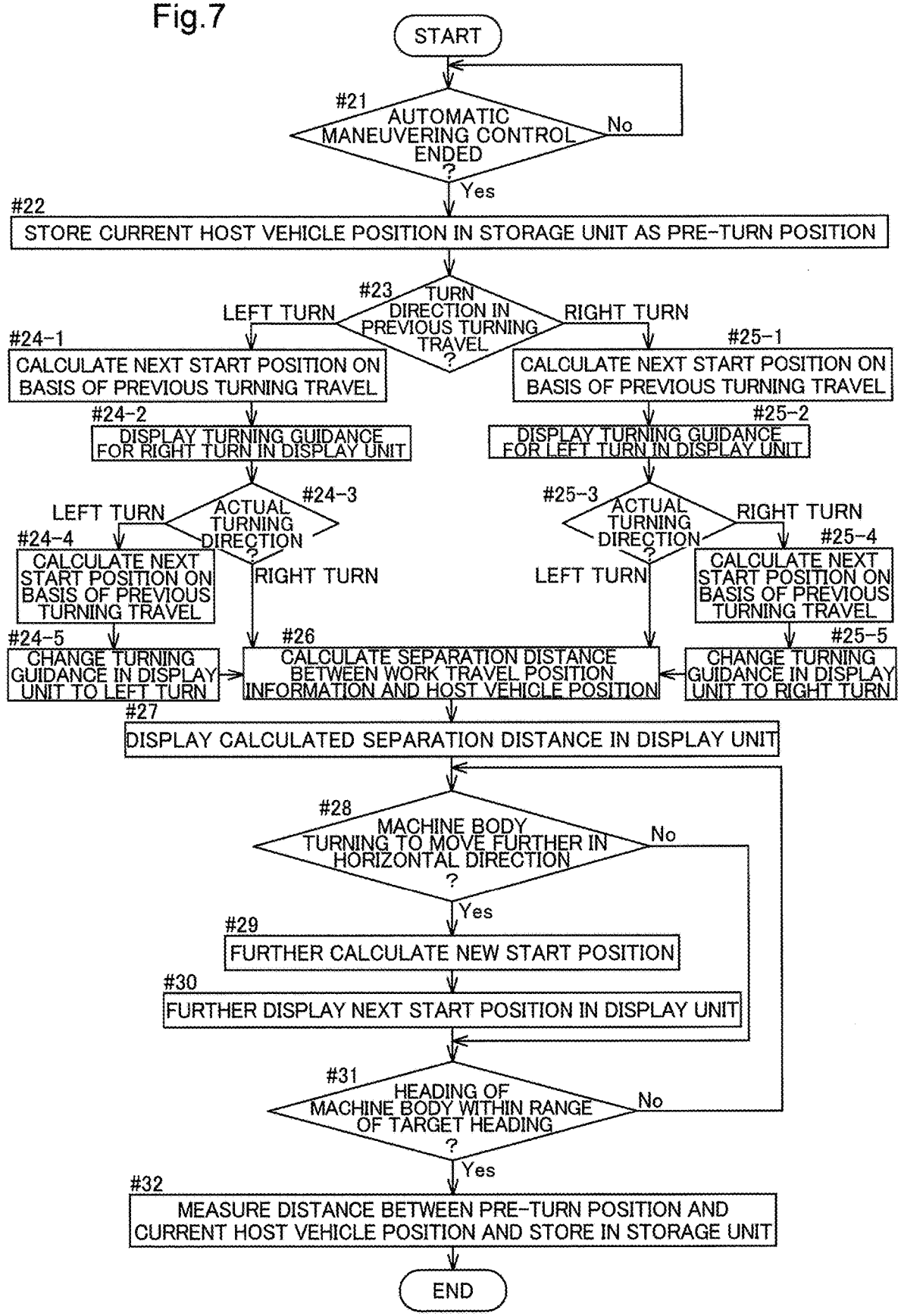
FIG. 7 is a flowchart illustrating processing for displaying the guidance information at the time of turning travel.

Descriptions of the flowchart in FIG. 7 will now be resumed. The distance calculation unit 76F (see FIG. 3) is configured or programmed to be capable of calculating the separation distance between the position information stored in the storage unit 81 and the position information based on the current position of the machine body 1. While the machine body 1 is performing turning travel, the separation distance between the work travel position information WP and the host vehicle position NM is calculated by the distance calculation unit 76F as time passes (step #26). In other words, the distance calculation unit 76F calculates the separation distance using the position information from the point in time when the end determination unit 76E (see FIG. 3) determines that the work travel has ended. The distance calculation unit 76F starts calculating the separation distance after the turning travel has started. Then, as indicated in the guidance information indicated by 8-B and 8-C in FIG. 9, a separation distance display DF, which is a distance of a component of the separation distance which is perpendicular or substantially perpendicular to the target heading LA, is displayed on the display unit 4 (step #27). In this manner, when the end determination unit 76E determines that the work travel has ended, the distance calculation unit 76F calculates the separation distance using, as the position information stored in the storage unit 81, the work travel position information WP, which is position information based on the work travel determined by the end determination unit 76E to have ended. Furthermore, the display unit 4 is configured or programmed to be capable of displaying the work travel position information WP and the separation distance display DF. The display unit 4 starts displaying the separation distance after the turning travel has started.

While the machine body 1 is performing the turning travel, the control device 75 determines, based on the position information of the machine body 1 measured by the satellite positioning unit 8a, whether or not the machine body 1 is turning to move farther in the horizontal direction than the start position Ls2 of the next work travel (step #28). FIG. 9 illustrates a state in which, in the turning travel, the machine body 1 travels a distance greater than the first separation distance P1 from the work travel position information WP in the horizontal direction, and passes the start position Ls2 of the next work travel (indicated as a planned start position Ls2' in FIG. 9). Although the planned start position Ls2' indicated in FIG. 9 was the start position Ls2 of the next work travel that was originally set, the planned start position Ls2' is not used as the start position Ls2 of the next work travel. In this case, a determination of Yes is made in step #28 of FIG. 7. When a determination of Yes is made in step #28, the start position calculation unit 76D calculates the start position Ls2 of a new work travel at a position separated from the planned start position Ls2' by the first separation distance P1 in the horizontal direction, on the side opposite from the side of the location of the work travel position information WP (step #29). A target travel route LM[n+2] illustrated in FIG. 9 is a planned target travel route LM set after the machine body 1 has reached the start position Ls2.

Figure 10:
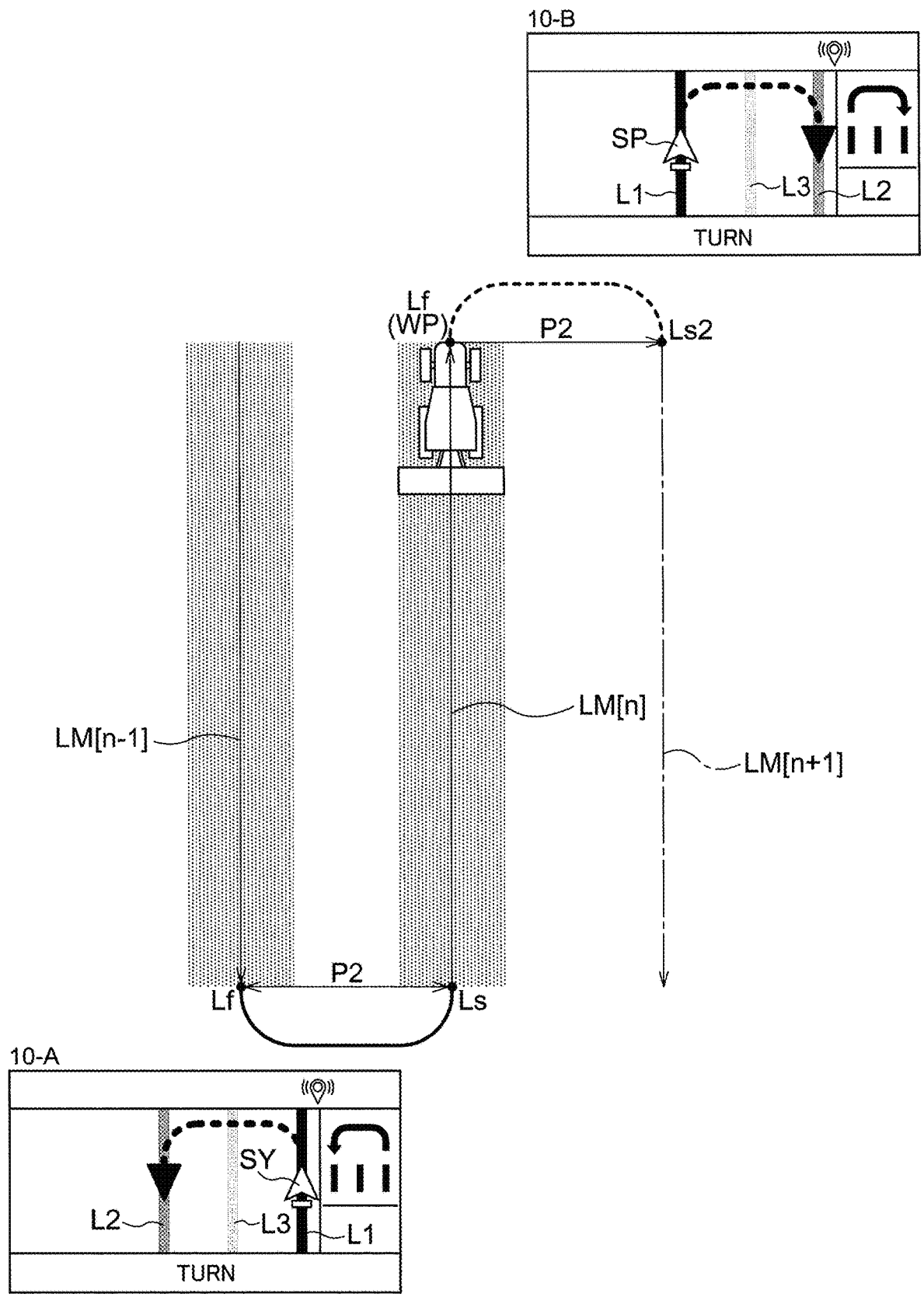
FIG. 10 is a descriptive diagram illustrating the guidance information at the time of turning travel.

A second separation distance P2, which is a separation distance between the work travel position information WP and the start position Ls2 of the new work travel, is indicated in FIG. 9. The second separation distance P2 is double the distance of the first separation distance P1. Based on this, an unworked portion having a width equivalent to the work width of the tilling device 3 in the horizontal direction remains between the area of the work travel based on the target travel route LM[n] and the area of the work travel to be performed based on the start position Ls2 of the new work travel. The width of the unworked portion is a width over which tilling work can be performed between already-worked portions on both sides, without gaps, when performing the tilling work. In FIG. 10 and FIG. 11 too, which will be described later, the second separation distance P2 is as described based on FIG. 9.

Additionally, when the start position calculation unit 76D has calculated the start position Ls2 of the new work travel, the guidance information for a right turn, indicated by 8-C in FIG. 9, is displayed on the display unit 4 as a map screen, based on the process of step #30. The work travel position information WP, the planned start position Ls2', and the start position Ls2 of the new work travel are displayed in the map screen indicated by 8-C as linear display lines L1, L2', and L2, respectively, which follow the target heading LA. The display line L2' based on the planned start position Ls2' is located between the display line L1 based on the work travel position information WP and the display line L2' based on the start position Ls2 of the new work travel. Then, a turning route indicated by a broken line is displayed from the display line L1 based on the work travel position information WP to the display line L2' based on the start position Ls2 of the new work travel, as a guide for reaching the start position Ls2 of the new work travel. The display of the machine body symbol SY and the display of the separation distance display DF in the guidance information indicated by 8-C in FIG. 9 are as already described based on the guidance information indicated by 8-B in the same drawing.

While the machine body 1 is performing turning travel, it is determined whether or not the heading deviation, calculated by the heading deviation calculation unit 77 (see FIG. 3), between the turning heading of the machine body 1 and the target heading LA is within a pre-set permissible range (step #31). If the heading deviation is outside the permissible range (step #31: No), the determination process of step #28, and the processes of step #29 and step #30 performed when a determination of Yes is made in step #28, are repeated. When the heading deviation is within the permissible range (step #31: Yes), the distance between the work travel position information WP and the start position Ls2 of the next work travel is stored in the storage unit 81 (see FIG. 3) (step #32), and the processing moves to the flowchart illustrated in FIG. 12, which will be described later. Additionally, after the turning travel has ended, the display unit 4 ends the display of the separation distance display DF.

In the determination in step #31, whether or not a distance, in the horizontal direction, between the work travel position information WP and the host vehicle positions NM calculated by the travel trajectory obtainment unit 78 is within the range of a reference distance that takes the work width of the work travel as a reference may be added as a determination item. In this case, aside from the work width of the work travel, a value which is an integral multiple of the work width may be used as the reference distance, or a value obtained by subtracting the aforementioned overlap amount from the value which is an integral multiple of the work width may be used as the reference distance.

Additionally, the distance recorded in the storage unit 81 in step #32 may be the actual distance between the work travel position information WP and the start position Ls2 of the next work travel, or may be a distance, among distances which are integral multiples of the reference distance which takes the work width of the work travel as a reference, that is close to the actual distance. In this manner, the distance stored in the storage unit 81 is, for example, the first separation distance P1, the second separation distance P2, or the like.

When the turning travel has been performed in such a manner that an unworked portion having a width equivalent to the work width of the tilling device 3 in the horizontal direction remains between the work travel position information WP and the start position Ls2 of the next work travel (see FIG. 9), guidance information such as that illustrated in FIG. 10 is displayed on the display unit 4 in the turning travel performed thereafter. The target travel route LM[n−1] in FIG. 10 may be thought of as being the same as the target travel route LM[n+2] set after the machine body 1 reaches the start position Ls2 in FIG. 9.

In FIG. 10, before the automatic maneuvering control in the target travel route LM[n], a left turn is made across the end position Lf of the target travel route LM[n−1] and the start position Ls of the target travel route LM[n]. The guidance information for a left turn, indicated by 10-A in FIG. 10 and FIG. 11, is displayed on the display unit 4 after automatic travel control along the target travel route LM[n−1] has been performed. The guidance information for a right turn, indicated by 10-B in FIG. 10 and FIG. 11, is displayed on the display unit 4 based on the process of step #24-2 indicated in FIG. 7, after the automatic travel control has been performed along the target travel route LM[n] and before the machine body 1 actually starts the turn. A map screen showing the machine body 1 and the surroundings of the machine body 1 is included in this guidance information. Additionally, although this guidance information is displayed in the side panel 21 illustrated in FIG. 2, the guidance information may be displayed in the meter panel 20 illustrated in the same drawing.

The end position Lf of the target travel route LM[n−1] and the start position Ls of the target travel route LM[n] are separated by the second separation distance P2, and the second separation distance P2 has a distance of double (or substantially double but less than double) the work width of the tilling device 3. Based on this, in FIG. 10, an unworked portion having a width equivalent to the work width of the tilling device 3 in the horizontal direction remains between the area of the work travel based on the target travel route LM[n−1] and the area of the work travel based on the target travel route LM[n]. When tilling work is performed in this unworked portion, the tilling work is performed, without gaps, between the area of the work travel based on the target travel route LM[n−1] and the area of the work travel based on the target travel route LM[n].

In the preferred embodiment illustrated in FIG. 10, in the previous turning travel, the end position Lf of the target travel route LM[n−1] and the start position Ls of the target travel route LM[n] are separated by the second separation distance P2. Based on this, the start position calculation unit 76D estimates that the next automatic maneuvering control will be performed at a position separated from the target travel route LM[n] in the horizontal direction by the second separation distance P2. The start position calculation unit 76D then calculates the start position Ls2 for the next work travel at a position which is in the horizontal direction to the side opposite from the side on which the target travel route LM[n−1] is located, and which is separated from the work travel position information WP by the second separation distance P2. The target travel route LM[n+1] illustrated in FIG. 10 is a planned target travel route LM set after the machine body 1 has reached the start position Ls2.

Figure 11:
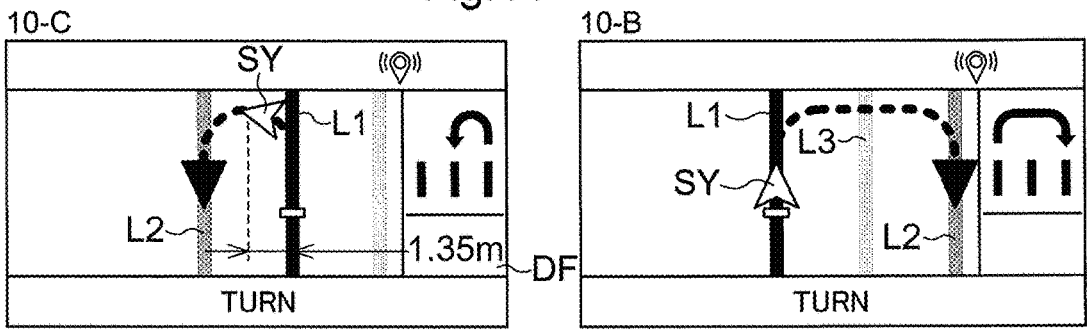
FIG. 11 is a descriptive diagram illustrating the guidance information at the time of turning travel.
Figure 11:
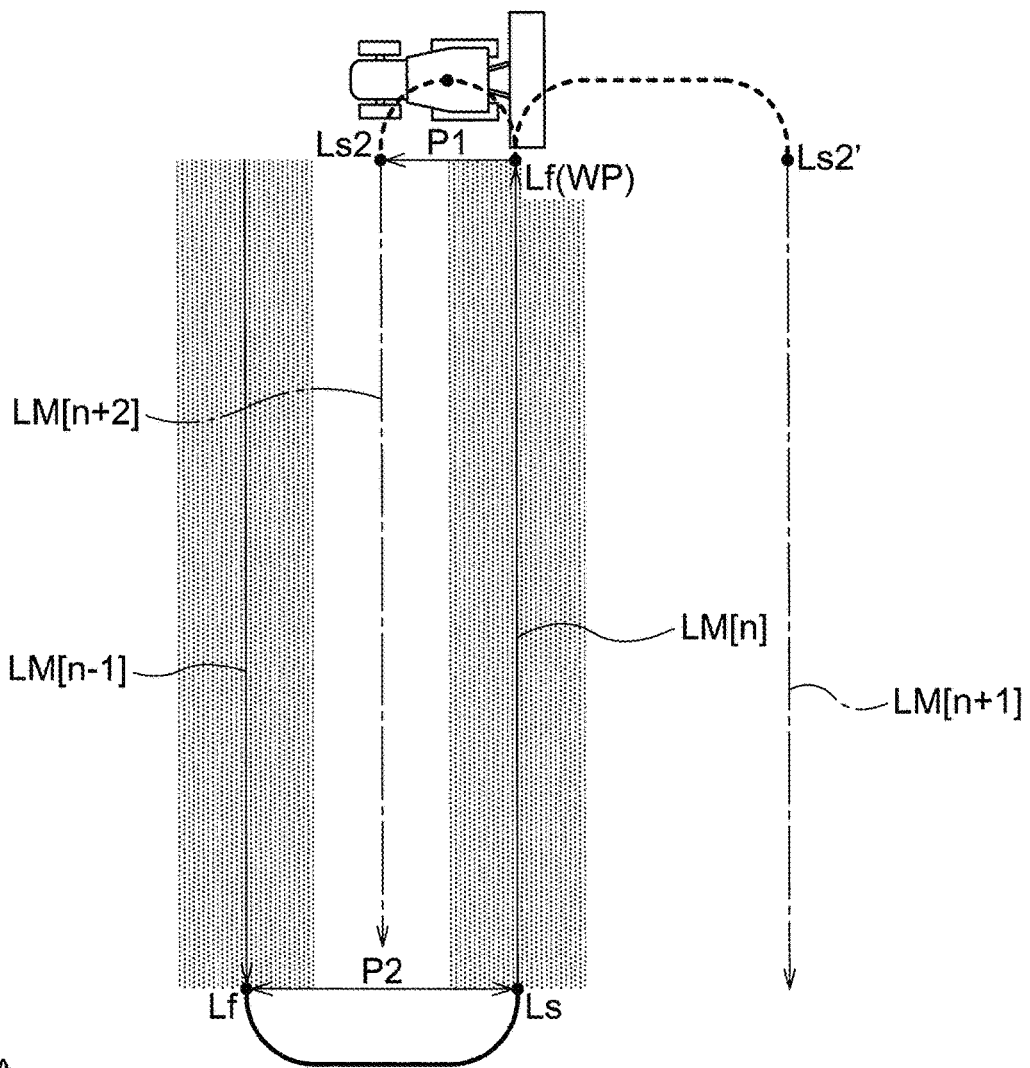
Figure 11:
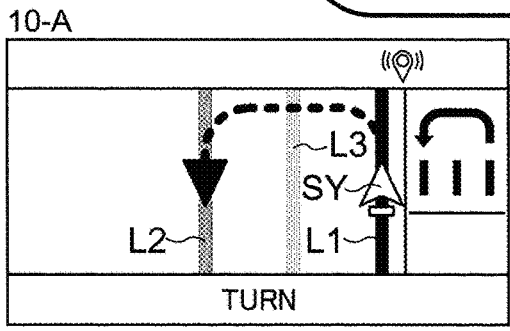

The display line L1 based on the work travel position information WP and the display line L2' based on the start position Ls2 of the next work travel are displayed in the guidance information indicated by 10-B in FIG. 10 and FIG. 11. In the preferred embodiment illustrated in FIG. 10, an unworked portion having a width equivalent to the work width of the tilling device in the horizontal direction remains between the work travel position information WP and the start position Ls2 of the next work travel. As such, a display line L3 indicating the unworked portion is displayed between the display line L1 based on the work travel position information WP and the display line L2 based on the start position Ls2 of the next work travel. Note that the width of the unworked portion is a width over which tilling work can be performed between already-worked portions on both sides, without gaps, when performing the tilling work.

As described above, the guidance information for a right turn, indicated by 10-B in FIG. 10 and FIG. 11, is displayed on the display unit 4 based on the process of step #24-2 indicated in FIG. 7, after the automatic travel control has been performed along the target travel route LM[n] and before the machine body 1 actually starts the turn. However, when, for example, the target travel route LM[n] is approaching a ridge, on one side of the field, that follows the target heading LA, it is conceivable that the machine body 1 cannot actually turn any farther to the right from the work travel position information WP. If the machine body 1 has actually turned to the left as indicated in FIG. 11, a left turn is determined in step #24-3 of FIG. 7, and the guidance information is changed to left turn guidance information, indicated by 10-C in FIG. 11, based on the process of step #24-5. The start position Ls2 indicated in FIG. 10 is indicated as the planned start position Ls2' in FIG. 11, and the planned start position Ls2' is not used as the start position Ls2 for generating the next target travel route LM.

In step #24-4 indicated in FIG. 7, the start position calculation unit 76D calculates the start position Ls2 to generate the next target travel route LM based on the previous turning travel. Thus as a rule, the start position calculation unit 76D calculates the start position Ls2 to generate the next target travel route LM at a position separated from the work travel position information WP by the second separation distance P2. However, in FIG. 11, the area of the work travel based on the target travel route LM[n−1] has already undergone work travel. Accordingly, if, when the machine body 1 makes a left turn, the start position Ls2 has been calculated at a position separated from the work travel position information WP by the second separation distance P2, the area that has already undergone work travel will overlap with the start position Ls2 of the next work travel. To avoid this problem, the start position calculation unit 76D searches for the start position Ls2 with priority given to unworked portions in areas on the left turn side. In the preferred embodiment illustrated in FIG. 11, an unworked portion remains between the area of the work travel based on the target travel route LM[n−1] and the area of the work travel based on the target travel route LM[n], as described earlier based on FIG. 10. The width of this unworked portion in the horizontal direction is equivalent to the work width of the tilling device 3. As such, instead of the planned start position Ls2' indicated in FIG. 11, the start position calculation unit 76D calculates the start position Ls2 for generating the next target travel route LM at a position separated from the work travel position information WP by the first separation distance P1. The target travel route LM[n+2] illustrated in FIG. 11 is a planned target travel route LM set after the machine body 1 has reached the start position Ls2.

After the above-described turning travel is complete, the manual maneuvering mode of the control device 75 is continued, and straight travel is continued based on human operation. During this period, the control device 75 confirms the determination conditions for heading deviation of the machine body 1 relative to the target heading LA, the direction of the front wheels 11, and the steering state of the steering wheel 16, and determines whether or not the state is one in which the mode can switch to the automatic maneuvering mode. Then, if the state is one in which the control device 75 can switch to the automatic maneuvering mode, the automatic maneuvering control is started in response to the occupant operating the trigger switch 49. Here, the occupant can, using the display unit 4, visually confirm whether or not the state is one in which the control device 75 can switch to the automatic maneuvering mode. At the same time, guidance information that assists the occupant in making the maneuvering operations is displayed on the display unit 4.

Figure 13:
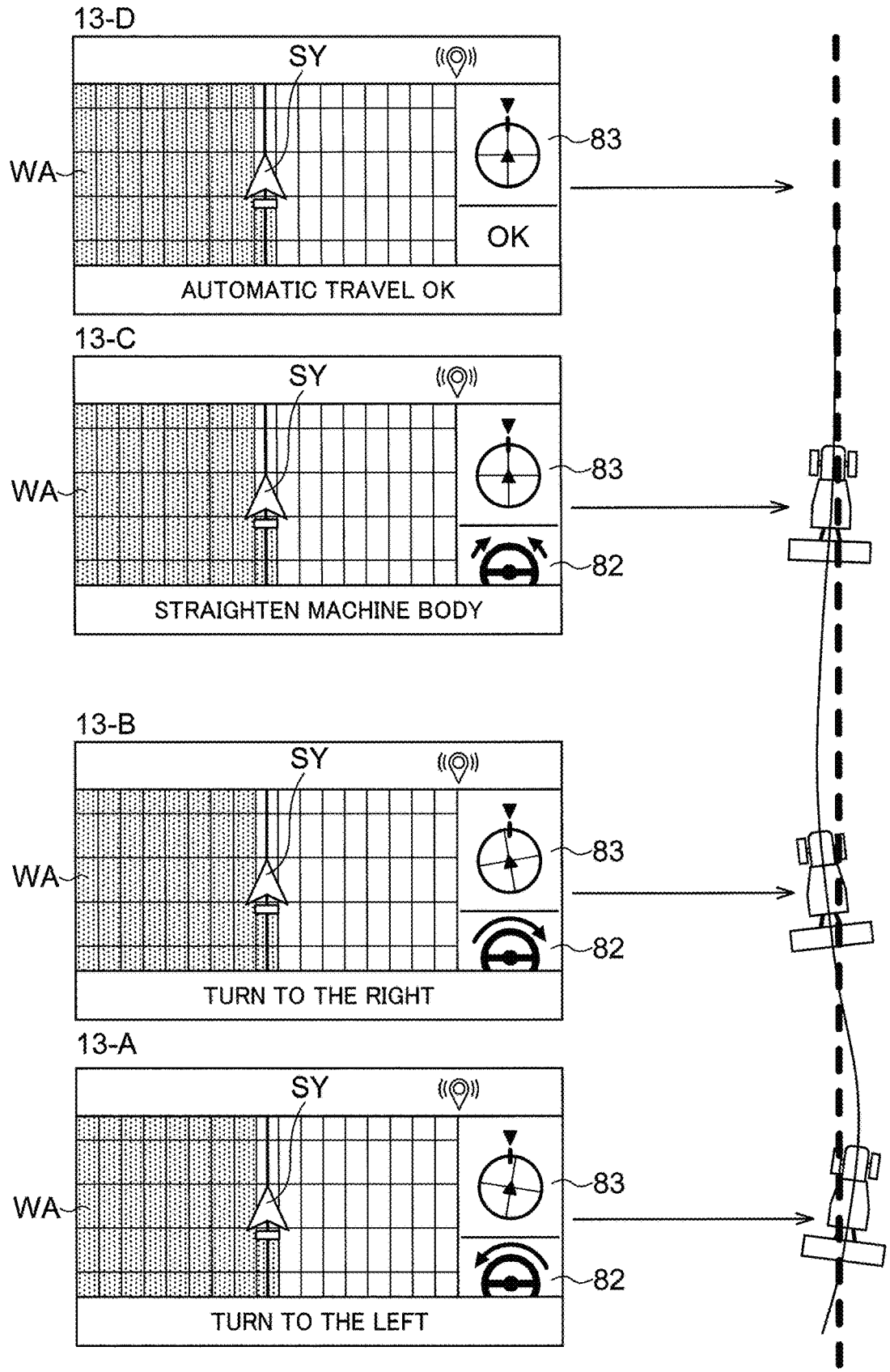
FIG. 13 is a descriptive diagram illustrating the guidance information before the start of automatic maneuvering control.

While the straight travel of the working machine based on human operations is continuing, a screen for the guidance information indicated by 13-A to 13-D in FIG. 13 is displayed on the display unit 4. A map screen showing the machine body 1 and the surroundings of the machine body 1 is included in this guidance information. This guidance information is displayed on the side panel 21 illustrated in FIG. 2, but may be displayed in the meter panel 20 displayed in the same drawing. A steering display 82 of the steering wheel 16, and a heading deviation display 83 of the machine body 1 calculated by the heading deviation calculation unit 77 are displayed in a vertical arrangement at the right end of the guidance information screen. Additionally, a map screen including the machine body symbol SY is displayed in the screen to the left of the steering display 82 and the heading deviation display 83, and in this map screen, already-worked portions, for which the tilling work is already complete, are indicated by a color indication WA. The color indication WA is calculated from the aggregation of the host vehicle positions NM stored in the storage unit 81 and the work width of the tilling device 3. This makes a clear visual distinction between already-worked portions and unworked portions. The configuration may be such that of the areas in which the color indication WA is displayed, areas that have undergone work travel three or more times, areas that have undergone work travel twice, and areas that have only undergone work travel once are distinguished by different colors. In other words, the configuration may be such that the color indication WA is a different color depending on the number of times work travel has been performed, and the already-worked portions in the guidance information are displayed using color indications WA of different colors. The color indication WA may instead be point-based indications or pattern-based indications.

Figure 12:
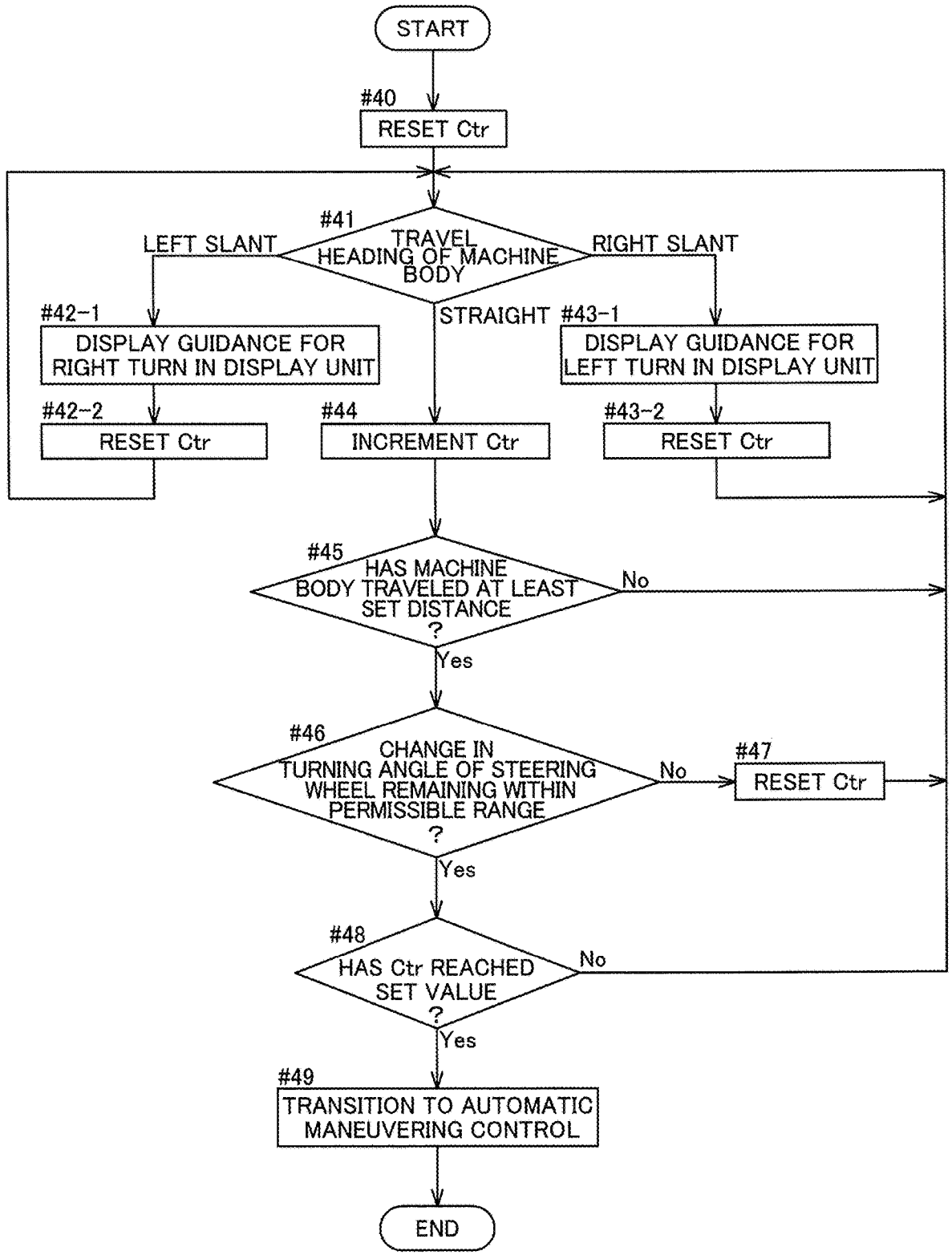
FIG. 12 is a flowchart illustrating processing for displaying the guidance information before the start of automatic maneuvering control.

The determination to start the automatic maneuvering control is made based on the flowchart illustrated in FIG. 12. The control device 75 is configured or programmed to use a determination counter Ctr to determine whether or not the state is one in which the control device 75 can switch to the automatic maneuvering mode. The value of the counter Ctr immediately after the turning travel has ended is set to zero (step #40). First, it is determined whether or not the heading deviation of the machine body 1 is within a permissible range with respect to the target heading LA (step #41). If the heading of the machine body 1 is slanted to the right relative to the target heading LA (step #41: right slant), guidance information for a left turn, indicated by 13-A in FIG. 13, is displayed on the display unit 4 (step #43-1). The value of the counter Ctr is then reset to zero (step #43-2). Information prompting the occupant to turn the steering wheel 16 to the left is displayed in the guidance information for a left turn indicated by 13-A in FIG. 13. If the heading of the machine body 1 is slanted to the left relative to the target heading LA (step #41: left slant), guidance information for a right turn, indicated by 13-B in FIG. 13, is displayed on the display unit 4 (step #42-1). The value of the counter Ctr is then reset to zero (step #42-2). Information prompting the occupant to turn the steering wheel 16 to the right is displayed in the guidance information for a right turn indicated by 13-B in FIG. 13.

While the machine body 1 is traveling straight in a direction following the target heading LA (step #41: straight), the counter Ctr is incremented (step #44), and the value of the counter Ctr increases. It is then determined whether or not the machine body 1 has traveled at least a set distance (step #45). Here, the "set distance" may be a pre-set distance from the start position Ls2 (see FIG. 8 to FIG. 11), or may be a pre-set distance from a state in which the machine body 1 travels straight in a direction following the target heading LA. If the machine body 1 has not traveled at least the set distance (step #45: No), the processing returns to step #41.

If the machine body 1 has traveled at least the set distance (step #45: Yes), it is determined whether a change in the turning angle of the steering wheel 16 remains within a permissible range (step #46). A state in which the steering wheel 16 is moved neither in the direction of a right turn nor in the direction of a left turn, and the directions of the front wheels 11 and the rear wheels 12 are parallel or substantially parallel, can be given as an example of a turning angle of the steering wheel 16 for when automatic maneuvering control is permitted, but the state is not limited thereto. For example, if the travel area of the machine body 1 is a ground surface that slopes in the horizontal direction, there is a risk that if the machine body 1 simply continues traveling straight, the machine body 1 will gradually shift toward the lower ground in the left-right direction. In such a case, the direction of the front wheels 11 is kept steered toward the high ground in the left-right direction, and as a result, it is easier for the machine body 1 to advance along the target heading LA. Accordingly, the turning angle of the steering wheel 16 when the automatic maneuvering control is permitted also includes states in which the steering wheel 16 is steered in the directions of a right turn or a left turn, for example. In other words, the control device 75 is configured or programmed so that the automatic maneuvering control is permitted when the turning angle of the steering wheel 16 continues to be kept within a set range. If the change in the turning angle of the steering wheel 16 is not kept within the permissible range (step #46: No), the counter Ctr is reset to zero (step #47). Note that the configuration may be such that in the process of step #47, the value of the counter Ctr may be decremented to reduce the value of the counter Ctr rather than resetting the value of the counter Ctr to zero.

The guidance information indicated by 13-C in FIG. 13 is displayed on the display unit 4 from when the straight travel is determined in step #41 to when the determination of step #46 is made. Then, when the counter Ctr has reached a pre-set value (step #48: Yes), the guidance information indicated by 13-D in FIG. 13 is displayed on the display unit 4, and the automatic maneuvering control is permitted. Then, the control mode of the control device 75 is switched from the manual maneuvering mode to the automatic maneuvering mode in response to the occupant operating the trigger switch 49, and the automatic maneuvering control is executed (step #49). The configuration may be such that if a sharp turn of the steering wheel 16 is detected after a determination of Yes is made in step #48 but before the occupant operates the trigger switch 49, the value of the counter Ctr is reset to zero, decremented, or the like.

Other Preferred Embodiments

The present invention is not limited to the configurations described as examples in the foregoing preferred embodiments, and examples of other representative preferred embodiments of the present invention will be given hereinafter.

(1) In the foregoing preferred embodiments, the direction of the machine body symbol SY changes within the map screen of the guidance information based on the turning heading calculated by the heading deviation calculation unit 77, as illustrated in FIG. 9 and the like, but the configuration is not limited to these preferred embodiments. For example, the configuration may be such that the machine body symbol SY is always fixed to be pointing upward, as illustrated in FIG. 8, with the surroundings of the machine body symbol SY rotating in response to changes in the turning heading calculated by the heading deviation calculation unit 77.

(2) In the foregoing preferred embodiments, the start position calculation unit 76D calculates the start position Ls2 based on the separation distance between the end position Lf and the start position Ls traveled between in the previous turning travel, but the configuration is not limited to these preferred embodiments. For example, the configuration may be such that the start position calculation unit 76D calculates the start position Ls2 based on the separation distance between an approximated line based on the travel trajectory in the work travel two times previous and an approximated line based on the travel trajectory in the previous work travel. Alternatively, the configuration may be such that the start position calculation unit 76D calculates the start position Ls2 based on a separation distance between any two points in the travel trajectory traveled between the end position Lf and the start position Ls in the previous turning travel. In other words, the start position calculation unit 76D may be configured or programmed to calculate the start position Ls2 based on the separation distance between the position where the previous turning travel started and the position where the previous turning travel ended.

(3) In the foregoing preferred embodiments, the distance calculation unit 76F calculates the separation distance using the work travel position information WP, which is position information from when the end determination unit 76E determines that the work travel has ended, but the configuration is not limited to these preferred embodiments. For example, the configuration may be such that the travel trajectory obtainment unit 78 obtains the travel trajectory based on an aggregation of the host vehicle positions NM stored in the storage unit 81, and the work travel position information WP is an approximated line calculated based on this travel trajectory. The distance calculation unit 76F may then be configured or programmed to calculate a separation distance between the work travel position information WP and the current position of the machine body 1 in the horizontal direction. In other words, any configuration may be used as long as when the end determination unit 76E determines that the work travel has ended, the distance calculation unit 76F calculates the separation distance using the work travel position information WP, which is position information based on the work travel determined to have ended by the end determination unit 76E, as the position information stored in the storage unit 81.

(4) In the foregoing preferred embodiments, the map screen is included in the guidance information displayed on the display unit 4, but the configuration may be such that the map screen is not included in the guidance information. For example, the guidance information displayed on the display unit 4 may be guidance information which uses symbols such as arrows, numerical values, messages, and so on. Additionally, although the turning route is displayed in the map screen, the configuration may be such that the turning route is not displayed in the map screen.

(5) In the foregoing preferred embodiments, the maneuvering operations are performed by changing the direction of the front wheels 11, but the configuration may be such that the maneuvering operations are performed by changing the direction of the rear wheels 12. In sum, the maneuvering control unit 80 may have any configuration that enables maneuvering control of the travel apparatus along the target heading LA.

(6) The satellite positioning unit 8a preferably is provided in the machine body 1, which is the subject of the positioning, as the above-described position detection unit 8, but the configuration is not limited to one in which a positioning signal is received directly from a satellite positioning system. For example, the configuration may be such that base stations that receive positioning signals from satellites are provided in a plurality of locations around the work vehicle, and the position information of the traveling work machine is identified through network communication processing with the plurality of base stations. In sum, the position detection unit 8 may have any configuration capable of detecting the position information of the machine body 1 based on a positioning signal from a navigation satellite.

(7) Although the target travel routes LM1 to LM6 illustrated as examples in FIG. 4 have linear shapes, the target travel routes LM1 to LM6 may have curved shapes instead, for example. In this case, the configuration may be such that the travel trajectory used when generating the reference route is formed having a curved shape, and the target heading LA changes gradually with progress along the curved shape.

(8) In the foregoing preferred embodiments, the steering wheel 16 is described as the maneuvering tool, but the maneuvering tool may be a swinging lever, a pair of buttons, or the like, for example.

(9) In the foregoing preferred embodiments, the display unit 4 displays a component, of the separation distance, that is perpendicular or substantially perpendicular to the target heading LA, but the configuration is not limited to this preferred embodiment. The display unit 4 may be configured or programmed to display the separation distance between the work travel position information WP and the current position of the machine body 1 as-is. Additionally, the display unit 4 may be configured or programmed to display both the separation distance between the work travel position information WP and the current position of the machine body 1, and the distance of the component, of the separation distance, that is perpendicular or substantially perpendicular to the target heading LA.

(10) In the foregoing preferred embodiments, the display unit 4 starts displaying the separation distance after the start of the turning travel, but the configuration may be such that the display of the separation distance is started from before the start of the turning travel. Additionally, in the foregoing preferred embodiments, the display unit 4 ends the display of the separation distance after the end of the turning travel, but the configuration may be such that the display of the separation distance is continued even after the end of the turning travel.

(11) In the foregoing preferred embodiments, the work travel position information WP is displayed in the map screen as a line following the target heading LA, but the configuration is not limited to these preferred embodiments. For example, the configuration may be such that the work travel position information WP is displayed as a dotted line in the map screen, or that a width corresponding to the work width of the tilling device 3 is filled in.

(12) Although a tractor is described as an example of a traveling work machine according to a preferred embodiment of the present invention, in addition to a tractor, preferred embodiments of the present invention can also be applied in harvesters, rice transplanters, seeding machines, and the like.

Note that the configurations disclosed in the foregoing preferred embodiments (including the other preferred embodiments; the same applies hereinafter) can be applied in combination with configurations described in other preferred embodiments as long as doing so does not produce any conflicts. Additionally, the preferred embodiments disclosed in the present specification are examples. The present invention is not limited to these preferred embodiments, and can be modified as appropriate.

Preferred embodiments of the present invention can be applied in traveling work machines in which a target heading can be calculated based on a travel trajectory and maneuvering of a machine body can be controlled to follow the target heading.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A traveling work machine that alternately and repeatedly performs a plurality of instances of work travel, in which a working device performs work while the traveling work machine automatically travels in a field along a pre-set target heading, and turning travel, in which the traveling work machine moves from an end position of the work travel to a start position of next work travel in an unworked portion of the field while switching to a direction opposite from the travel direction of the work travel, the traveling work machine comprising:
   a position detector to obtain position information of a machine body based on a positioning signal of a navigation satellite;
   a controller configured or programmed to function as:
      an end determiner to determine an end of each of a plurality of instances of the work travel; and
      a start position calculator to calculate the start position;
   a display to display information pertaining to the turning travel; and
   a maneuvering tool through which a maneuvering operation of the machine body is able to be performed by a human; wherein
   when the end determiner determines the end of the work travel, the start position calculator calculates, based on the position information, the start position to be on one of a left and a right of a travel direction of the machine body in the work travel, and the display displays guidance information guiding the turning travel to the start position;
   a map screen displaying the machine body and surroundings of the machine body is included in the guidance information; and
   when, in the turning travel, the maneuvering tool is operated in a turn direction to a side opposite from the side on which the start position calculator has calculated the start position, the start position calculator re-calculates the start position in a turn direction on the side to which the maneuvering tool has been operated, and the display re-displays the start position further in the turn direction on the side to which the maneuvering tool has been operated than the machine body in the map screen.

2. The traveling work machine according to claim 1, wherein
   the start position calculator calculates the start position based on a separation distance between a position where a previous instance of the turning travel started and a position where the previous instance of the turning travel ended; and
   the display displays, in the guidance information, the start position calculated based on the separation distance.

3. The traveling work machine according to claim 1, wherein
   when, for a previous instance of the turning travel, the start position has been calculated in a turn direction in one of a left or a right side relative to the travel direction, the start position calculator calculates, for a current instance of the turning travel, the start position in a turn direction in an other of the left or the right side relative to the travel direction, and the display displays the start position further toward the other of the left and the right sides than the machine body in the map screen.

4. The traveling work machine according to claim 3, wherein the display displays a turning route of the turning travel in the map screen.

5. A traveling work machine that alternately and repeatedly performs a plurality of instances of work travel, in which a working device performs work while the traveling work machine automatically travels in a field along a pre-set target heading, and turning travel, in which the traveling work machine moves from an end position of the work travel to a start position of next work travel in an unworked portion of the field while switching to a direction opposite from the travel direction of the work travel, the traveling work machine comprising:
- a position detector to obtain position information of a machine body based on a positioning signal of a navigation satellite;
- a storage to store the position information;
- a controller configured or programmed to function as:
  - an end determiner to determine an end of each of a plurality of instances of the work travel; and
  - a distance calculator to calculate a separation distance between the position information stored in the storage and the position information based on a current position of the machine body; and
- a display to display information pertaining to the turning travel; wherein when the end determiner determines the end of the work travel, the distance calculator calculates the separation distance using work travel position information as the position information stored in the storage, the work travel position information being the position information based on the work travel for which the end determiner has determined the end, and the display is configured to display the work travel position information and the separation distance.

6. The traveling work machine according to claim 5, wherein
the display displays the machine body and surroundings of the machine body as a map screen; and
the work travel position information is displayed in the map screen as a line following the target heading.

7. The traveling work machine according to claim 5, wherein the display displays a distance of a component of the separation distance that is perpendicular to the target heading.

8. The traveling work machine according to claim 5, wherein the distance calculator calculates the separation distance using the position information from a time when the end determiner determines the end of the work travel.

9. The traveling work machine according to claim 5, wherein the display starts displaying the separation distance after the turning travel has started.

10. The traveling work machine according to claim 9, wherein the display ends the display of the separation distance after the turning travel has ended.

* * * * *